United States Patent
Florea et al.

(10) Patent No.: US 11,573,559 B2
(45) Date of Patent: Feb. 7, 2023

(54) TECHNIQUES FOR GENERATING AND PERFORMING ANALYTICAL INSTRUMENT TEST PLANS

(71) Applicant: WATERS TECHNOLOGIES IRELAND LIMITED, Dublin (IE)

(72) Inventors: Claudia Elena Florea, Brasov (RO); Benjamin Brueck, Langgöns (DE); Alexandru Iacob, Brasov (RO); Thomas Fennig, Gründau (DE)

(73) Assignee: WATERS TECHNOLOGIES IRELAND LIMITED, Dublin (IE)

( * ) Notice: Subject to any disclaimer, the term of this patent is extended or adjusted under 35 U.S.C. 154(b) by 0 days.

(21) Appl. No.: 17/079,049

(22) Filed: Oct. 23, 2020

(65) Prior Publication Data
US 2021/0124338 A1 Apr. 29, 2021

Related U.S. Application Data

(60) Provisional application No. 62/926,016, filed on Oct. 25, 2019.

(51) Int. Cl.
*G05B 19/418* (2006.01)
(52) U.S. Cl.
CPC .............. *G05B 19/41875* (2013.01)
(58) Field of Classification Search
CPC ................................ G05B 19/41875
See application file for complete search history.

(56) References Cited

U.S. PATENT DOCUMENTS

| | | | |
|---|---|---|---|
| 6,581,012 B1 * | 6/2003 | Aryev | G05B 19/41865 702/22 |
| 2006/0036393 A1 * | 2/2006 | Raph | G01D 7/00 702/120 |
| 2014/0195446 A1 * | 7/2014 | Yurach | G06Q 30/018 705/317 |
| 2015/0088434 A1 * | 3/2015 | Grabau | G01N 25/00 702/34 |
| 2017/0362467 A1 | 12/2017 | Qie et al. | |
| 2019/0303450 A1 * | 10/2019 | Richards | G06F 16/338 |

(Continued)

OTHER PUBLICATIONS

International Search Report and Written Opinion for International application No. PCT/IB2020/059998, dated Jan. 28, 2021, 12 pages.

(Continued)

*Primary Examiner* — Thomas C Lee
*Assistant Examiner* — Ameir Myers
(74) *Attorney, Agent, or Firm* — Goodwin Procter LLP

(57) ABSTRACT

Techniques and apparatus for analytical instrument management and information assessment processes are described. In one embodiment, for example, an apparatus may include at least one memory and logic coupled to the at least one memory. The logic may be configured to perform a test plan on at least one rubber material analytical instrument via accessing a test plan comprising at least one step, generating test plan results responsive to performing the test plan on the at least one rubber material analytical instrument, analyzing the test plan results, and presenting the test plan results on a plurality of graphical user interface (GUI) objects. Other embodiments are described.

17 Claims, 23 Drawing Sheets

(56) References Cited

U.S. PATENT DOCUMENTS

2020/0116745 A1* 4/2020 Frenzel ............. G01N 35/0092

OTHER PUBLICATIONS

Brookfield DV-II+Pro Viscometer Operating Instructions Manual No. M03-165-F012, Brookfield Engineering Laboratories, Inc. [online][retrieved on Oct. 20, 2016]. Retrieved from Internet URL: http://www.brookfieldengineering.com/download/files/dv2pro.pdf, 102 pages.

International Preliminary Report on Patentability for International Patent Application No. PCT/IB2021/062209, dated May 5, 2022.

* cited by examiner

TECHNIQUES FOR GENERATING AND PERFORMING ANALYTICAL INSTRUMENT TEST PLANS

CROSS-REFERENCE TO RELATED APPLICATIONS

This application claims the benefit of and priority to U.S. Provisional Patent Application No. 62/926,016, filed on Oct. 25, 2019, the entire contents of which is hereby incorporated by reference.

TECHNICAL FIELD

Embodiments herein generally relate to managing and operating analytical instruments, and, more particularly, to processes for generating test protocols to be performed by an analytical instrument and methods for reviewing the resultant analytical information.

BACKGROUND

The manufacture of material products entails testing to ensure that quality control requirements have been met. Each type of material may have a suite of tests to ensure that the product has been manufactured within proscribed guidelines. For example, rubber manufacturers typically perform various tests according to protocols developed by standards organizations, such as the ASTM. Exemplary rubber manufacturing tests may include isothermal tests, viscosity tests, frequency sweep tests, amplitude sweep tests, conditioning tests, ramp tests, relaxation tests, and/or the like. The performance of these tests involves multiple types of instruments and testing procedures. According to conventional processes, rubber manufacturers have to manage multiple interfaces and test procedure applications in order to perform all of the required quality control procedures. This adds complexity and resources that add significantly to the cost of manufacturing rubber products. A system capable of effectively and efficiently managing the suite of instruments and test protocols required to certify a batch of product would increase rubber manufacturer productivity and decrease production costs.

SUMMARY

This Summary is provided to introduce a selection of concepts in a simplified form that are further described below in the Detailed Description. This Summary is not intended to necessarily identify key features or essential features of the claimed subject matter, nor is it intended as an aid in determining the scope of the claimed subject matter.

In accordance with various aspects of the described embodiments is an apparatus that may include at least one memory and logic coupled to the at least one memory. The logic may perform a test plan on at least one rubber material analytical instrument via accessing a test plan comprising at least one step, generating test plan results responsive to performing the test plan on the at least one rubber material analytical instrument, analyzing the test plan results, and presenting the test plan results on a plurality of graphical user interface (GUI) objects.

In some embodiments of the apparatus, the at least one rubber material analytical instrument may include a plurality of different types of rubber material analytical instruments managed via a central graphical user interface. In various embodiments of the apparatus, the at least one rubber material analytical instrument may include at least one of a rheometer, a moving die rheometer (MDR), a viscometer, a Mooney viscometer (MV), a rubber process analyzer (RPA), an automated density tester (ADT), or an automated hardness tester (AHT). In some embodiments of the apparatus, the at least one step may include at least one of isothermal, non-isothermal, frequency sweep, amplitude sweep, conditioning, ramp test, or relaxation. In various embodiments of the apparatus, the at least one step may be associated with at least one tag, the at least one tag for defining an element of results data. In exemplary embodiments of the apparatus, the at least one tag may include a results value and at least one threshold value.

In some embodiments of the apparatus, the at least one step may include a plurality of steps, the logic to modify an execution order of the plurality of steps responsive to user input via one of the plurality of GUI objects. In various embodiments of the apparatus, the logic may present a results GUI screen, the results GUI screen displaying a results indicator for the at least one test plan executed via the at least one rubber material analytical instrument, the results indicator comprising graphical symbols indicating information associated with executed steps of the step plan.

In some embodiments of the apparatus, the logic may create a test plan comprising test plan information, the test plan information comprising at least one or more of available procedures, test plan summary, or test plan details. In various embodiments of the apparatus, the test plan information may include one or more test steps, the one or more test steps comprising one or more parameters. In some embodiments of the apparatus, the one or more parameters may include one or more of units, default values, nominal values, alarms, tags, thresholds, limits, upper control limits, lower control limits, temperature, pressure, amplitude, time, and step tests. In exemplary embodiments of the apparatus, the one or more test steps may include one or more test step types, the test step types comprising isothermal, non-isothermal, viscosity, elasticity, frequency sweep, amplitude sweep, conditioning, ramp test, or relaxation. In some embodiments of the apparatus, the tags may include one or more of base units, nominal value, lower specification limit, upper specification limit, lower control limit, upper control limit, lower warning limit, or upper warning limit.

In accordance with various aspects of the described embodiments is a computer-implemented method to perform a test plan on at least one rubber material analytical instrument. The method may include, via a processor of a computing device operably coupled to the at least one rubber material analytical instrument, accessing a test plan comprising at least one step; generating test plan results responsive to performing the test plan on the at least one rubber material analytical instrument; analyzing the test plan results; and presenting the test plan results on a plurality of GUI objects.

In some embodiments of the method, the at least one rubber material analytical instrument may include a plurality of different types of rubber material analytical instruments managed via a central graphical user interface. In various embodiments of the method, the at least one step may include at least one of isothermal, non-isothermal, frequency sweep, amplitude sweep, conditioning, ramp test, or relaxation. In exemplary embodiments of the method, the at least one step may include a plurality of steps, the method further comprising modifying an execution order of the plurality of steps responsive to user input via one of the plurality of GUI objects.

In accordance with various aspects of the described embodiments is a non-transitory computer-readable medium storing instructions that, when executed, cause one or more processors to perform a test plan on at least one rubber material analytical instrument to access a test plan comprising at least one step; generate test plan results responsive to performing the test plan on the at least one rubber material analytical instrument; analyzing the test plan results; and present the test plan results on a plurality of GUI objects.

In some embodiments of the non-transitory computer-readable medium, the at least one rubber material analytical instrument may include a plurality of different types of rubber material analytical instruments managed via a central graphical user interface. In some embodiments of the non-transitory computer-readable medium, the at least one step may include at least one of isothermal, non-isothermal, frequency sweep, amplitude sweep, conditioning, ramp test, or relaxation.

DETAILED DESCRIPTION

Figure 1:
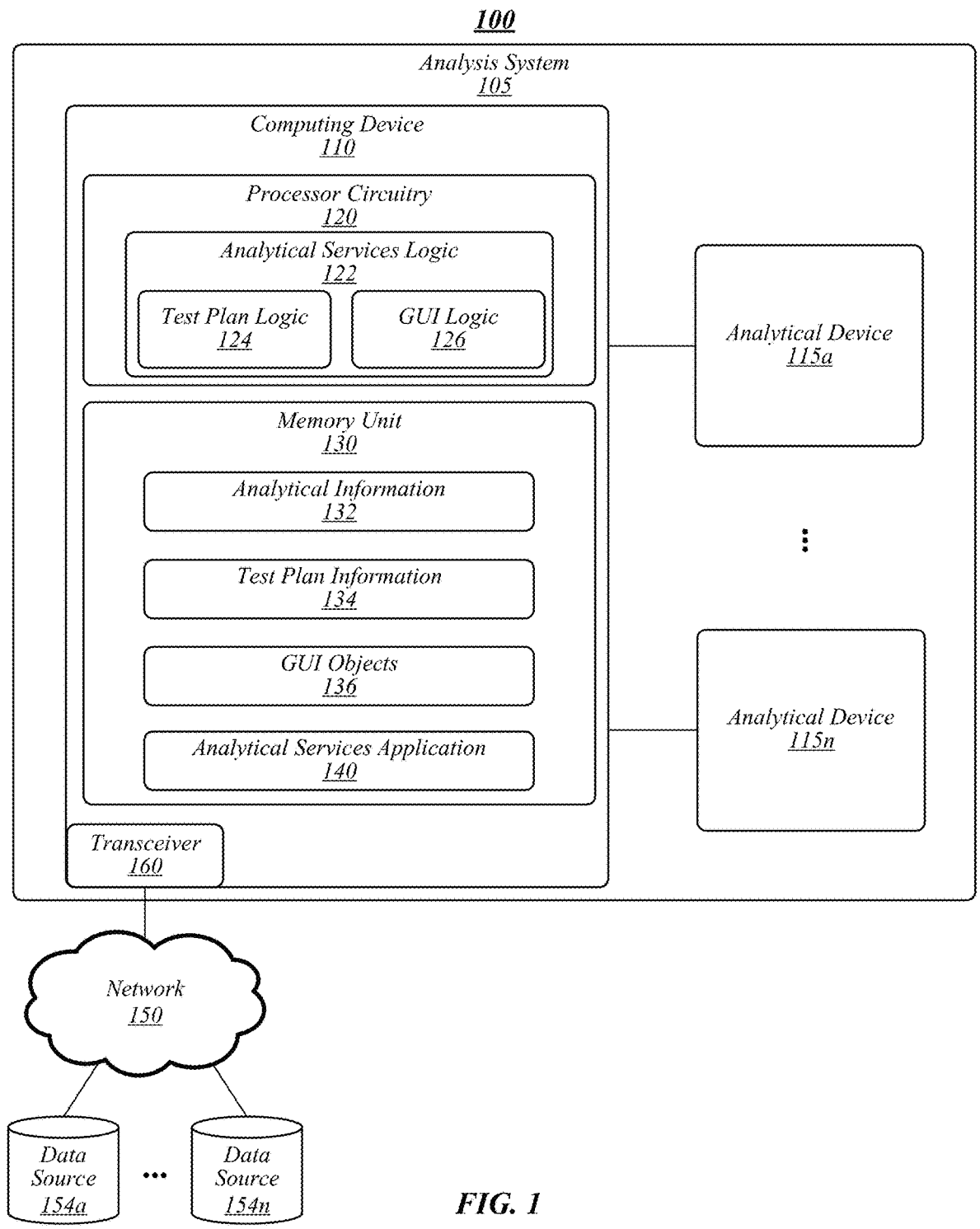
FIG. 1 illustrates an embodiment of a first operating environment.

Various embodiments may generally be directed toward systems, methods, and/or apparatus for instrument control and data analysis of analytical instruments. In some embodiments, the analytical instruments may include instruments used in the manufacture and/or testing of rubber products. Non-limiting examples of analytical instruments may include a rheometer (for instance, a moving die rheometer (MDR)), a viscometer (for instance, a Mooney viscometer (MV)), a rubber process analyzer (RPA), an automated density tester (ADT), an automated hardness tester (AHT), and/or the like. Although rubber manufacturing and/or testing devices are used in examples in this Detailed Description, embodiments are not so limited, as any type of analytical instrument capable of operating according to some embodiments is contemplated herein.

In various embodiments, the analytical services application may integrate and organize data from multiple instruments and tests, including historical data, which may be organized, compared, and analyzed by product characteristics, such as material type, inventory order, date, and/or the like. The analytical services application may be operated by different categories of users, including production users and/or research users. The analytical services application may be configured to control multiple types of rubber-specific instruments from different instrument manufacturers and to analyze information collected from these instruments. In some embodiments, the analytical services application may be used to program experiments and obtain quick feedback of experimental results. In various embodiments, the analytical services application may provide access to raw test data to allow, for example, performance of future calculations post-acquisition. In exemplary embodiments, the analytical services application may provide for specific testing capabilities, such as calculating the activation energy of product reactions or predict/model the temperature and curing profile using advanced analyses (for instance, kinetics). In various embodiments, the analytical services application may provide a graphical user interface (GUI) that provides for an improved user experience of operating rubber testing instruments and working with data. For example, embodiments may include GUIs capable of creating, editing, and/or executing test plans and reviewing test results. Embodiments are not limited in this context.

Accordingly, analytical services applications according to some embodiments may provide multiple technological advantages over conventional systems, including improvements in computing technology. For instance, a non-limiting example of a technological advantage may include an analytical services application operating according to some embodiments that provides for enhanced data visualization and presentation to allow operators to more effectively and efficiently manage test data. Another non-limiting example of a technological advantage may include an analytical services application operating according to some embodiments that provides a central GUI platform for operating a plurality of different instruments, including instruments of different manufacturers, and test plans for the plurality of different instruments. A further non-limiting technological advantage may include an analytical services application operating according to some embodiments that may provide for rubber test plans comprised of multi-step procedures and GUI objects for creating, managing, and operating multi-step procedures. Embodiments are not limited in this context.

In the following description, references to "one embodiment," "an embodiment," "example embodiment," "various embodiments," etc., indicate that the embodiment(s) of the technology so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

FIG. 1 illustrates an example of an operating environment 100 that may be representative of some embodiments. As shown in FIG. 1, operating environment 100 may include an analysis system 105 operative to manage analytical data associated with analytical devices 115a-n. In some embodiments, analytical devices 115a-n may be or may include instruments used in the manufacture and/or testing of rubber products. Non-limiting examples of instruments may include thermal analyzers, rheometers, microcalorimeters, dilatometers, thermal conductivity meters, flash diffusivity analyzers, a viscometer (for instance, an MV), an RPA, an ADT, an AHT, and/or the like. Illustrative instruments may include rubber manufacturing and/or testing instruments provided by TA Instruments of New Castle, Del., United States and other similar manufacturers.

In some embodiments, computing device 110 may be communicatively coupled to analytical devices 115a-n. In other embodiments, computing device 110 may not be communicatively coupled to analytical devices 115a-n. Computing device 110 may obtain analytical information 132 directly from data sources 154a-n and/or directly from analytical devices 115a-n. In some embodiments, computing device 110 may be or may include a standalone computing device, such as a personal computer (PC), server, tablet computing device, cloud computing device, and/or the like. In some embodiments, computing device 110 may be a separate device from analytical devices 115a-n (for instance, a "work station"). In other embodiments, at least a portion of computing device 110 may be a part, such as an integrated controller, of analytical devices 115a-n.

As shown in FIG. 1, computing device 110 may include processing circuitry 120, a memory unit 130, and a transceiver 160. Processing circuitry 120 may be communicatively coupled to memory unit 130 and/or transceiver 160.

Processing circuitry 120 may include and/or may access various logic for performing processes according to some embodiments. For instance, processing circuitry 120 may include and/or may access analytical services logic 122, test plan logic 124, and/or GUI logic 126. Processing circuitry and/or analytical services logic 122, test plan logic 124, and/or GUI logic 126, or portions thereof, may be implemented in hardware, software, or a combination thereof. As used in this application, the terms "logic, "component," "layer," "system," "circuitry," "decoder," "encoder," and/or "module" are intended to refer to a computer-related entity, either hardware, a combination of hardware and software, software, or software in execution, examples of which are provided by the exemplary computing architecture 600. For example, a logic, circuitry, or a layer may be and/or may include, but are not limited to, a process running on a processor, a processor, a hard disk drive, multiple storage drives (of optical and/or magnetic storage medium), an object, an executable, a thread of execution, a program, a computer, hardware circuitry, integrated circuits, application specific integrated circuits (ASIC), programmable logic devices (PLD), digital signal processors (DSP), field programmable gate array (FPGA), a system-on-a-chip (SoC), memory units, logic gates, registers, semiconductor device, chips, microchips, chip sets, software components, programs, applications, firmware, software modules, computer code, combinations of any of the foregoing, and/or the like.

Although analytical services logic 122 is depicted in FIG. 1 as being within processing circuitry 120, embodiments are not so limited. In addition, although test plan logic 124 and GUI logic 126 are depicted as being a logic of analytical services logic 122, embodiments are not so limited, as test plan logic 124 and GUI logic 126 may be separate logics and/or may not be standalone logics but, rather, a part of analytical services logic 122. For example, analytical services logic 122, and/or any component thereof, may be located within an accelerator, a processor core, an interface, an individual processor die, implemented entirely as a software application (for instance, analytical services application 140) and/or the like.

Memory unit 130 may include various types of computer-readable storage media and/or systems in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In addition, memory unit 130 may include various types of computer-readable storage media in the form of one or more lower speed memory units, including an internal (or external) hard disk drive (HDD), a magnetic floppy disk drive (FDD), and an optical disk drive to read from or write to a removable optical disk (e.g., a CD-ROM or DVD), a solid state drive (SSD), and/or the like.

Memory unit 130 may store an analytical services application 140 that may operate, alone or in combination with analytical services logic 122, to perform various functions according to some embodiments.

In various embodiments, analytical services application 140 may, in combination with analytical services logic 122, test plan logic 124, and/or GUI logic 126, operate to perform, execute, implement, support, or otherwise facilitate rubber test plan processes and/or information assessment processes according to some embodiments. In various embodiments, for example, analytical services application 140 may, in combination with analytical services logic 122, test plan logic 124, and/or GUI logic 126, provide GUI objects, screens, pages, windows, and/or the like for facilitating information assessment processes (see, for example, FIGS. 5A-5R).

Analytical services logic 122 may control analytical devices 115a-n to perform test plans specified in test plan information 134. In various embodiments, test plan logic 124 may be used to generate test plans according to some embodiments. A user may define a test plan, which may include a multi-step procedure. For example, a user may define a test plan that includes RPA procedures that has single or multiple step types including, without limitation, isothermal, non-isothermal, frequency sweep, amplitude sweep, conditioning, ramp test, relaxation, and/or the like. In various embodiments, a test plan may have multiple procedures of the same type (for instance, two isothermal steps, three amplitude sweep steps, and/or the like). Saved test plans may be added to a library in test plan information 134 for future selection and use. GUI logic 126 may operate to present information, objects, and/or the like for the generation and execution of test plans via analytical services application and the assessment of analytical information 132 generated during execution of a test plan.

Figure 2:
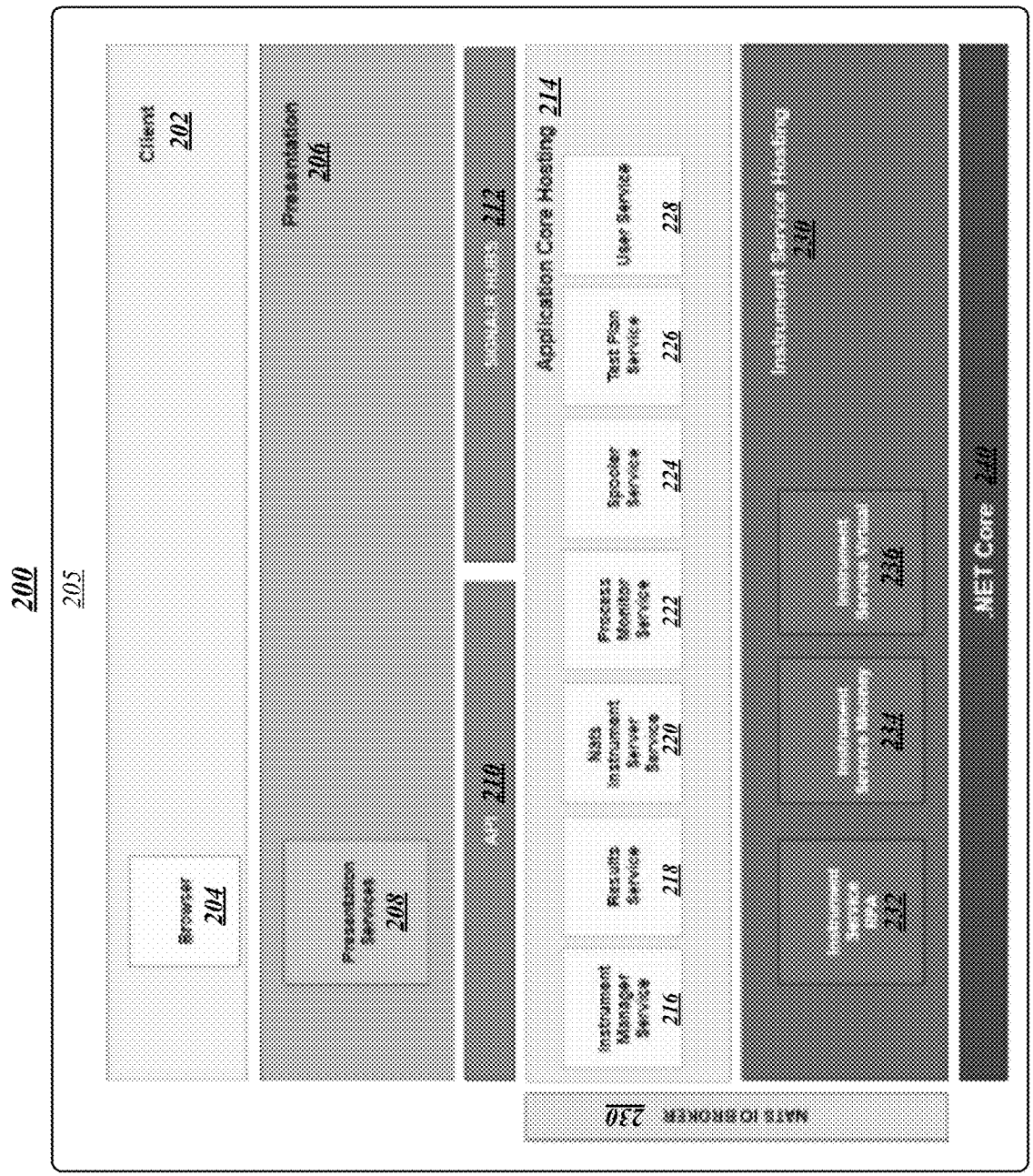
FIG. 2 illustrates an embodiment of a second operating environment.

FIG. 2 illustrates an example of an operating environment 200 that may be representative of some embodiments. As shown in FIG. 2, operating environment 200 may include an architecture 205 for implementing an analytical services application according to some embodiments. In some embodiments, architecture 205 may include a client layer 202, a presentation layer 206, an application core hosting layer 21r, an instrument services hosting layer 230, and/or a software framework layer 240 (for instance, a Microsoft .Net core).

In various embodiments, client layer 202 may include a browser 204, for example, for providing a platform for users to access GUI objects, such as screens for generating or executing test plans, accessing test results, and/or the like. Presentation layer 206 may include presentation services 208, for example, operative to generate GUI objects, screens, and/or the like for presentation via browser 204. An application programming interface (API) component 210 and a server-client messaging/notification component 212

(for instance, SignalR) may be arranged between presentation layer 206 and application core hosting layer 214.

In various embodiments, core hosting layer 214 may include an instrument management service 216, a results service 218, an instrument messaging server service 220 (for instance, NATS messaging system), a process monitor service 222, a spooler service 224, a test plan service 226, and a user service 228. Instrument service hosting layer 230 may include services for various actual and/or virtual instruments, such as an RPA instrument service 232, an MV instrument service 234, and/or a virtual instrument service. In various embodiments, a message service 230 (for instance, a NATS I/O broker) may be arranged between application core hosting layer 214 and instrument service hosting layer 230.

Figure 3:
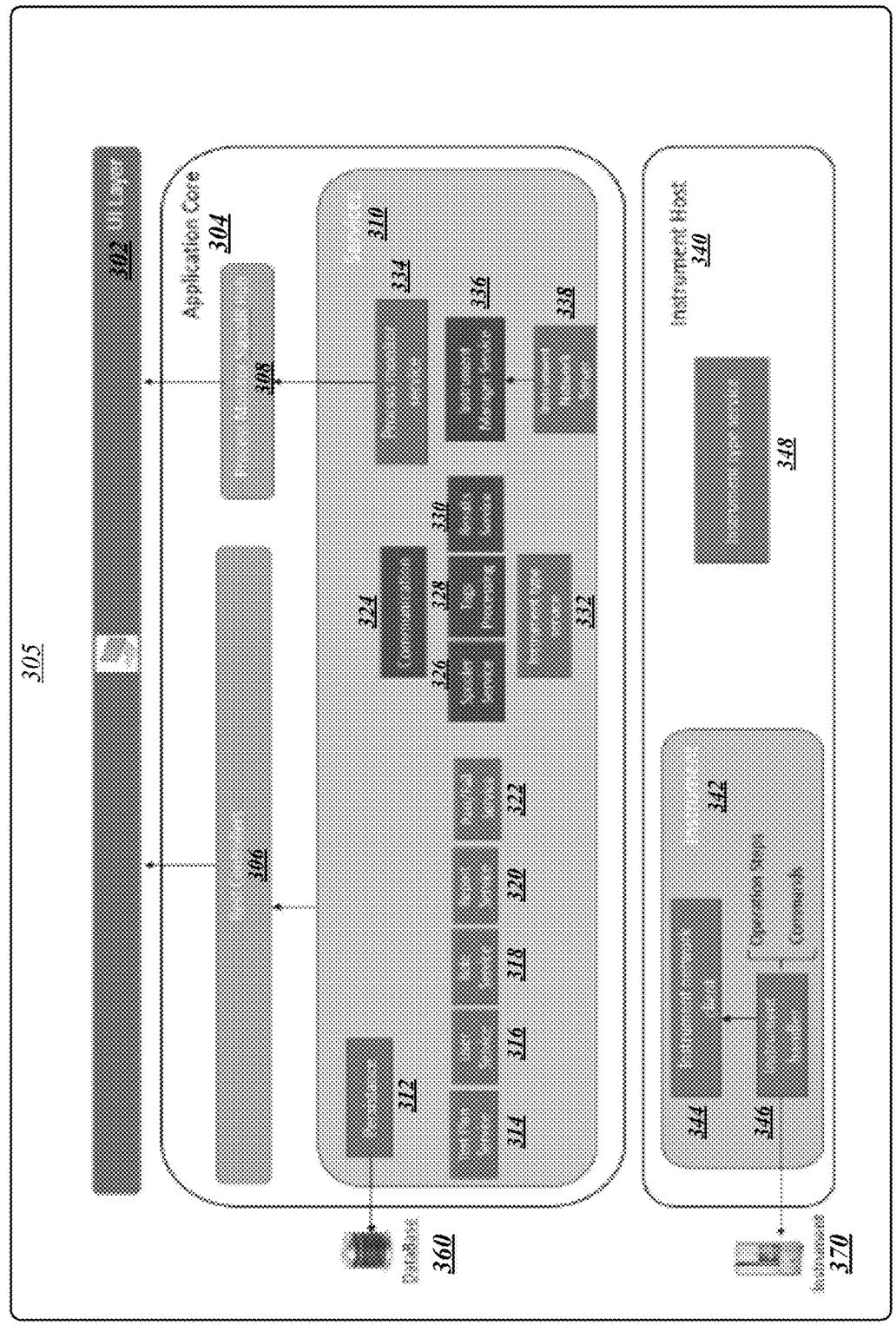
FIG. 3 illustrates an embodiment of a third operating environment.

FIG. 3 illustrates an example of an operating environment 300 that may be representative of some embodiments. As shown in FIG. 3, operating environment 300 may include an architecture 305 for implementing an analytical services application according to some embodiments. In some embodiments, architecture 305 may include an application core 304 and an instrument host 340. A user interface (UI) or GUI layer 302 may be operably coupled to application core 304 and may be configured to present GUI objects and/or information generated according to some embodiments to users.

In exemplary embodiments, application core 304 may include one or more web services controllers 306 (for instance, REST controllers) and a process monitor messaging hub 308 (for instance, implemented via SignalR). Application core 304 may implement a plurality of services 310 including a test plan service 314, a user service 316, a role service 318, a report service 320, a pass/fail service 322, a communication service 324, a spooler service 326, a tags processing service 328, a results service 330, an instrument type service 332, a process monitor service 334, an instrument manager service 336, and/or an instrument network server 338. In some embodiments, a persistence service 312 may be used to store information generated via services 310 in a database 360 or other storage component or structure.

In exemplary embodiments, instrument host 340 may include an instrument service 342 associated with an analytical instrument 370 and an instrument type service 348. Instrument service 342 may include an instrument handler 346 for performing operation steps and other commands on instrument and an instrument network client 344.

Included herein are one or more logic flows representative of exemplary methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, hardware, or any combination thereof. In software and firmware embodiments, a logic flow may be implemented by computer executable instructions stored on a non-transitory computer readable medium or machine readable medium, such as an optical, magnetic or semiconductor storage. The embodiments are not limited in this context.

Figure 4:
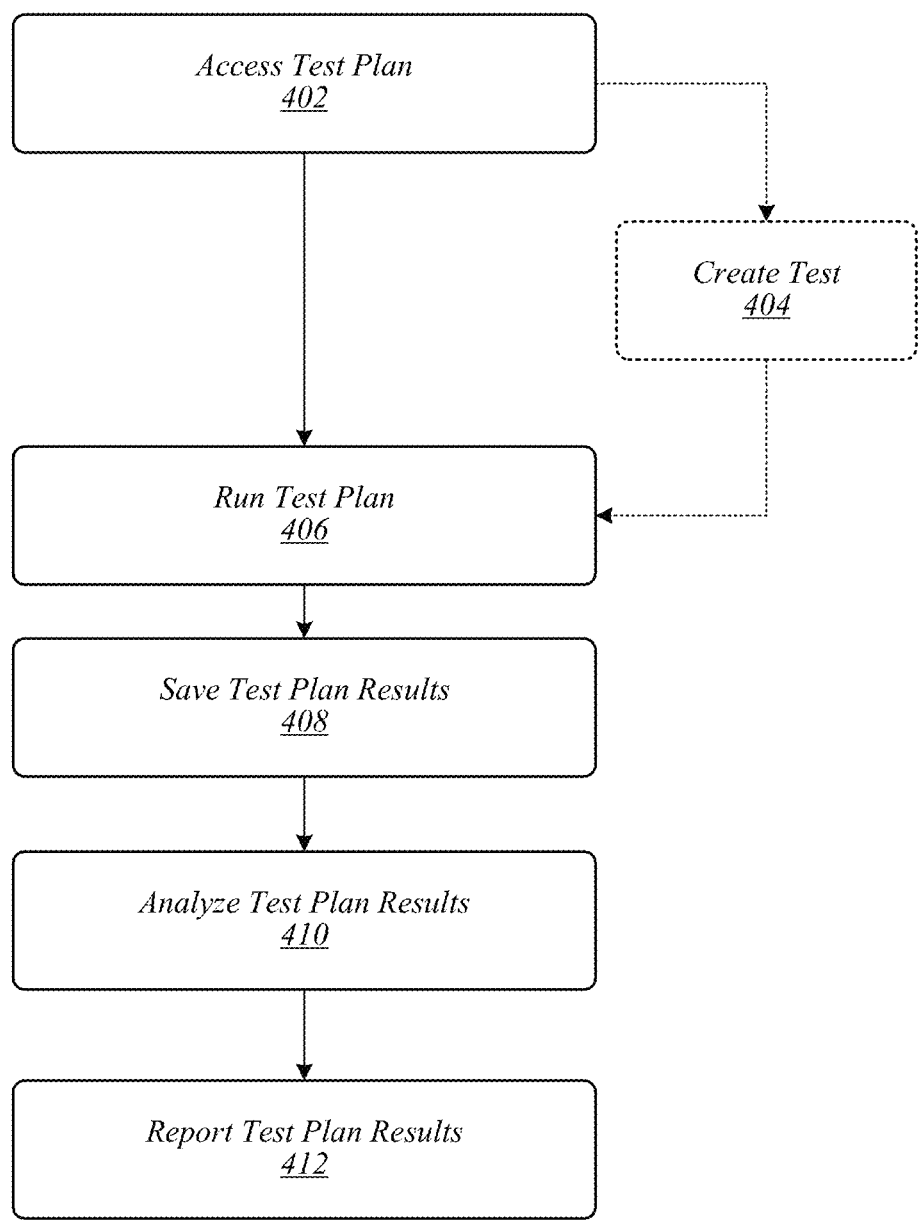
FIG. 4 illustrates a logic flow according to an embodiment.
Figure 5A:
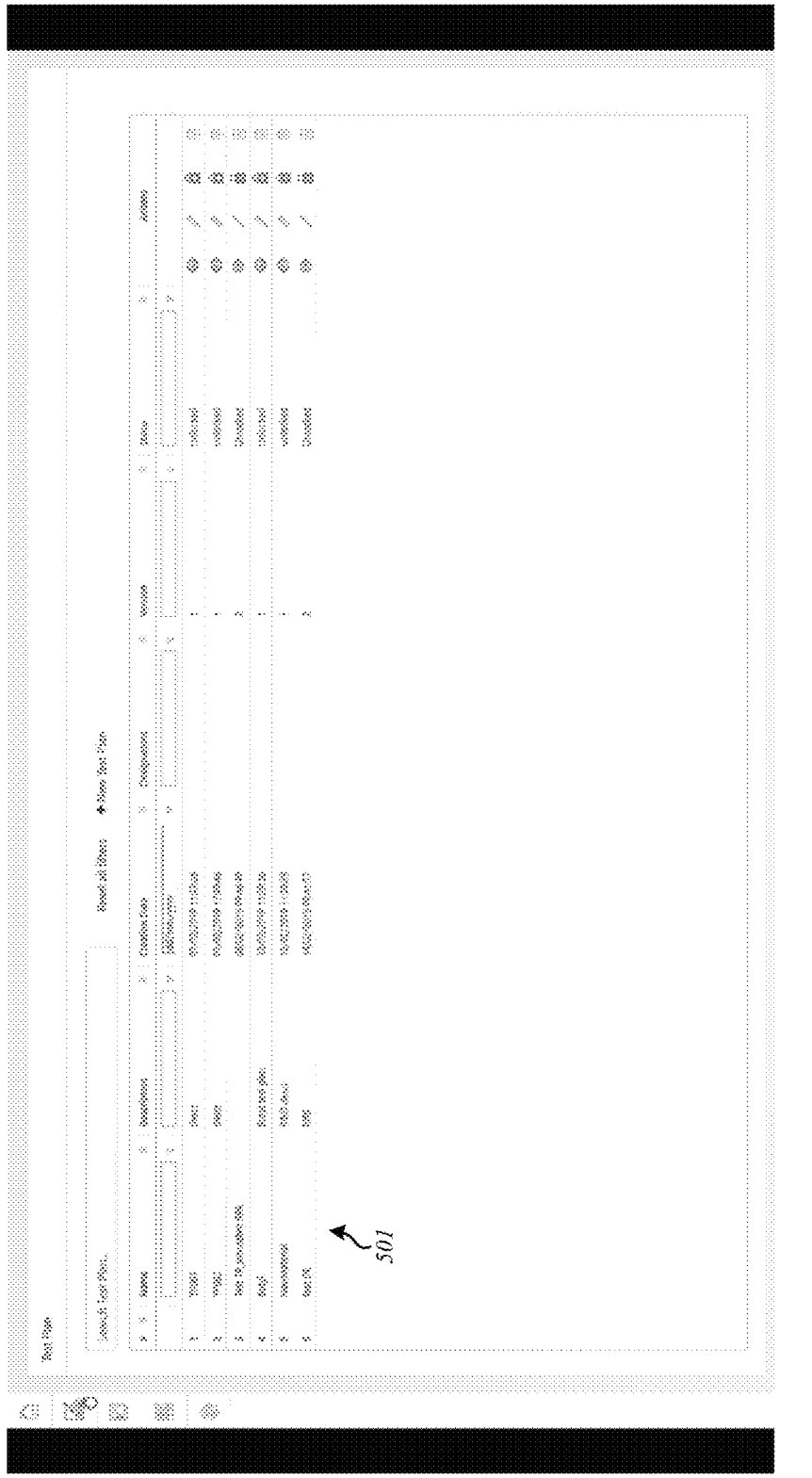
FIGS. 5A-5R illustrate embodiments of graphical user interfaces for an analytical services application.
Figure 5B:
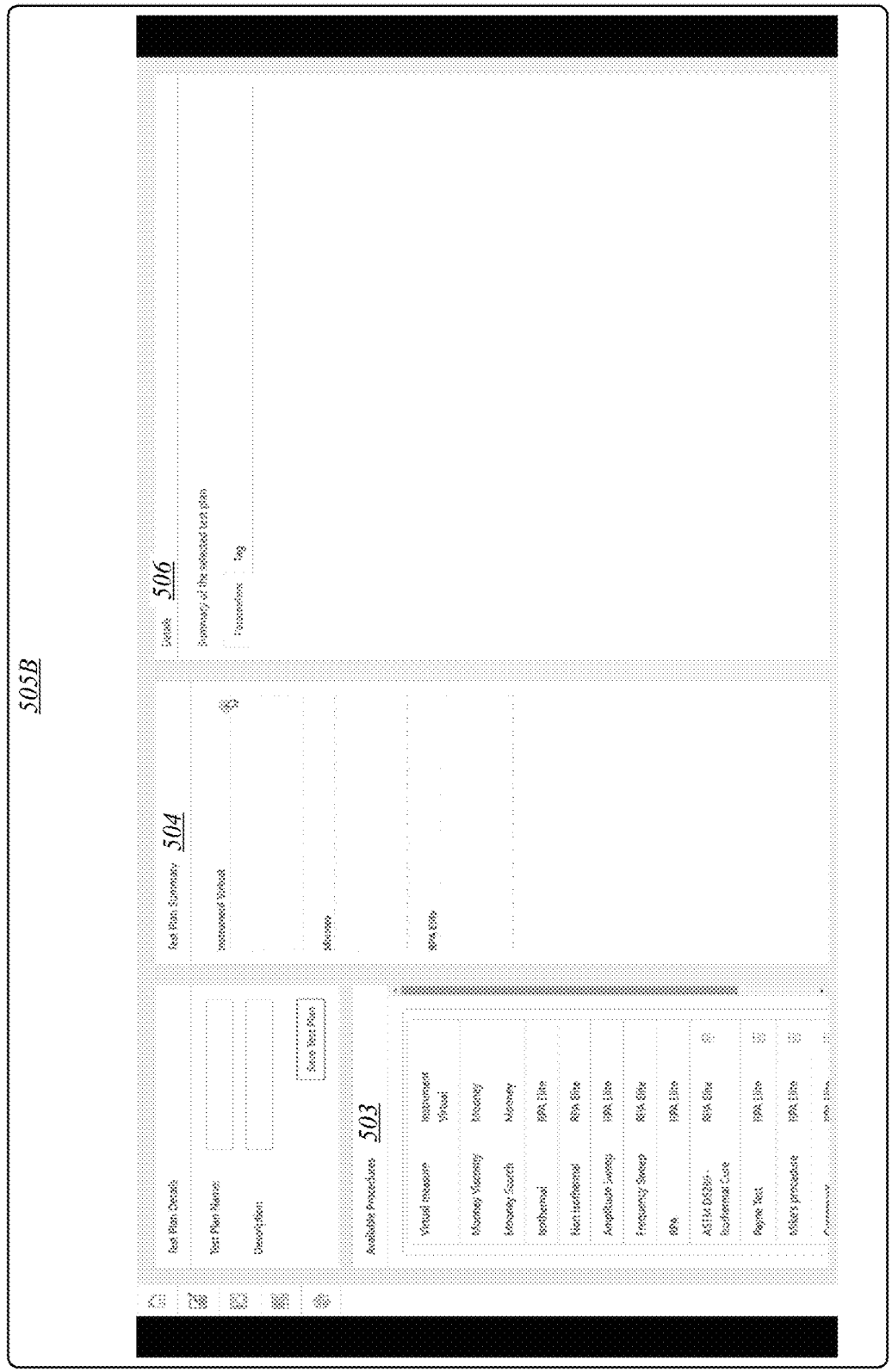
Figure 5C:
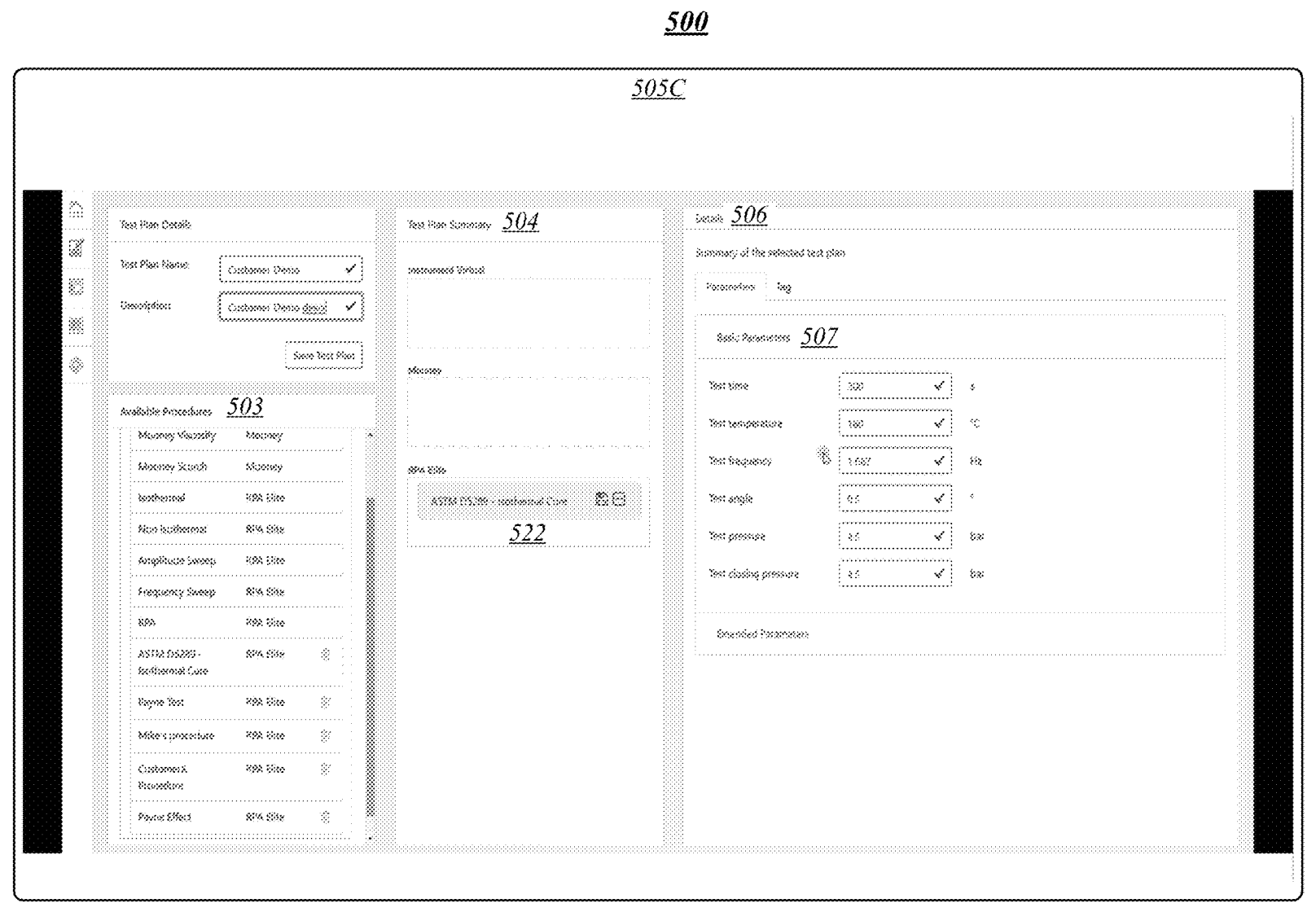
Figure 5E:
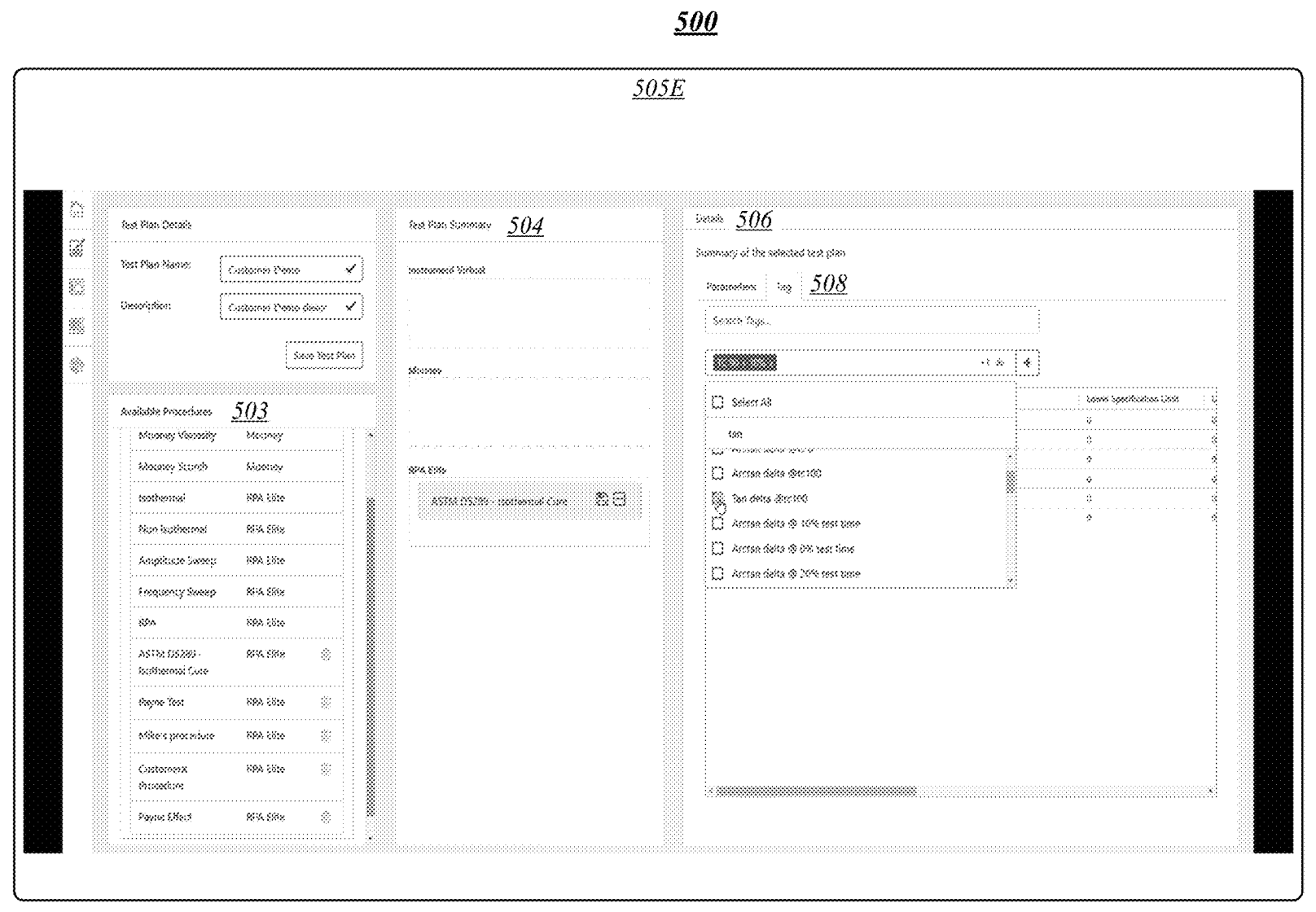
Figure 5F:
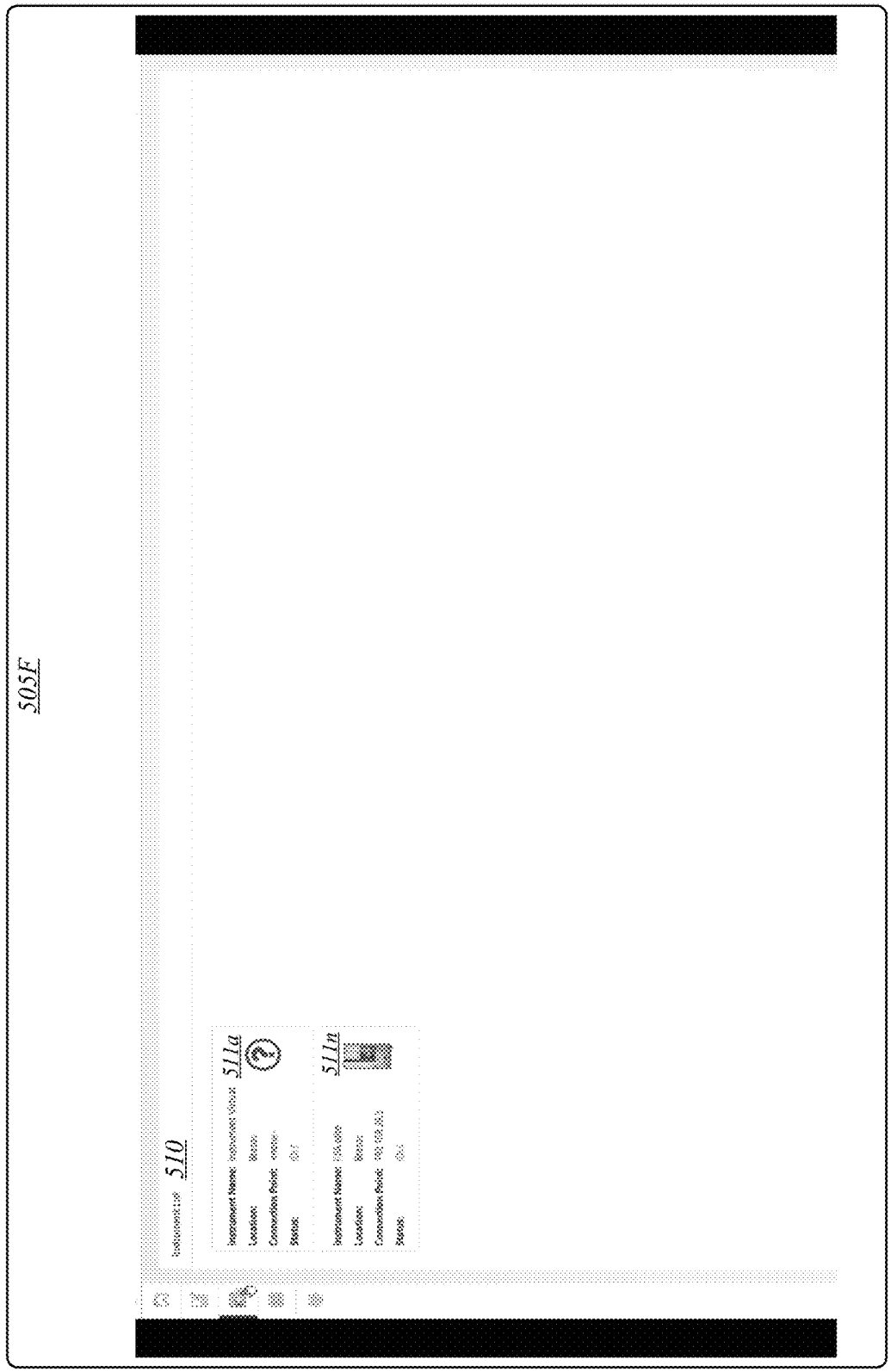
Figure 5G:
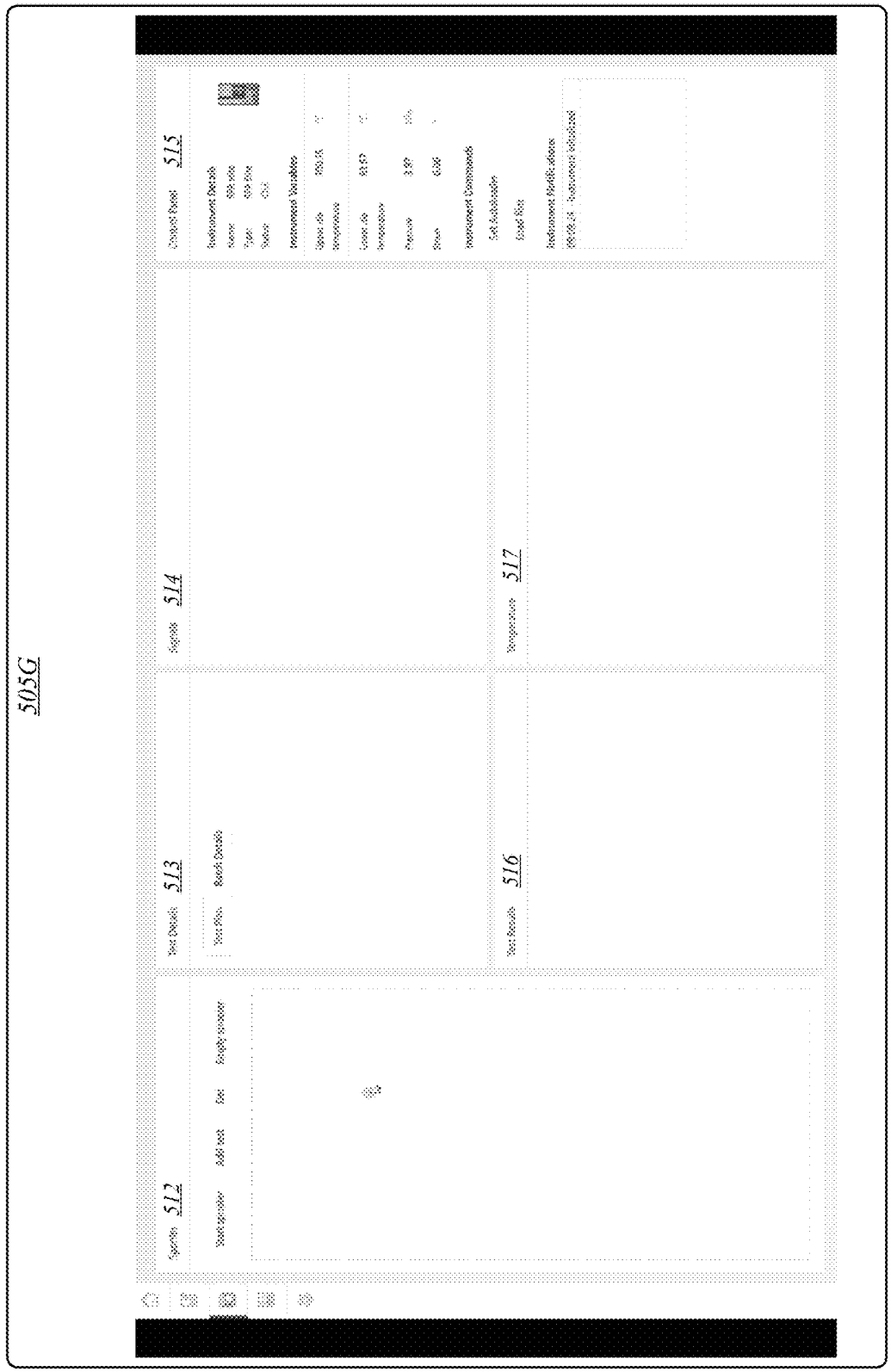
Figure 5H:
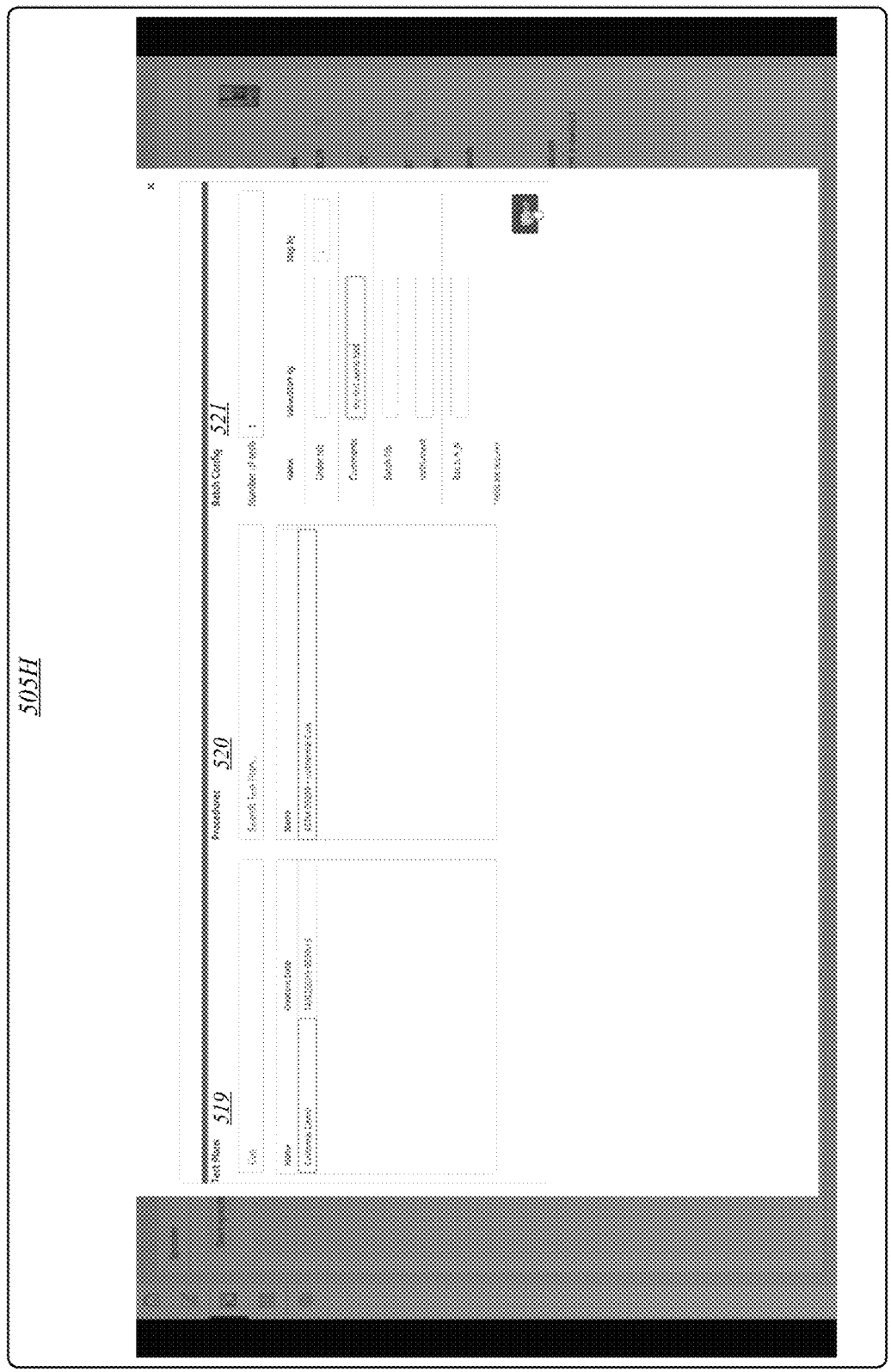
Figure 5I:
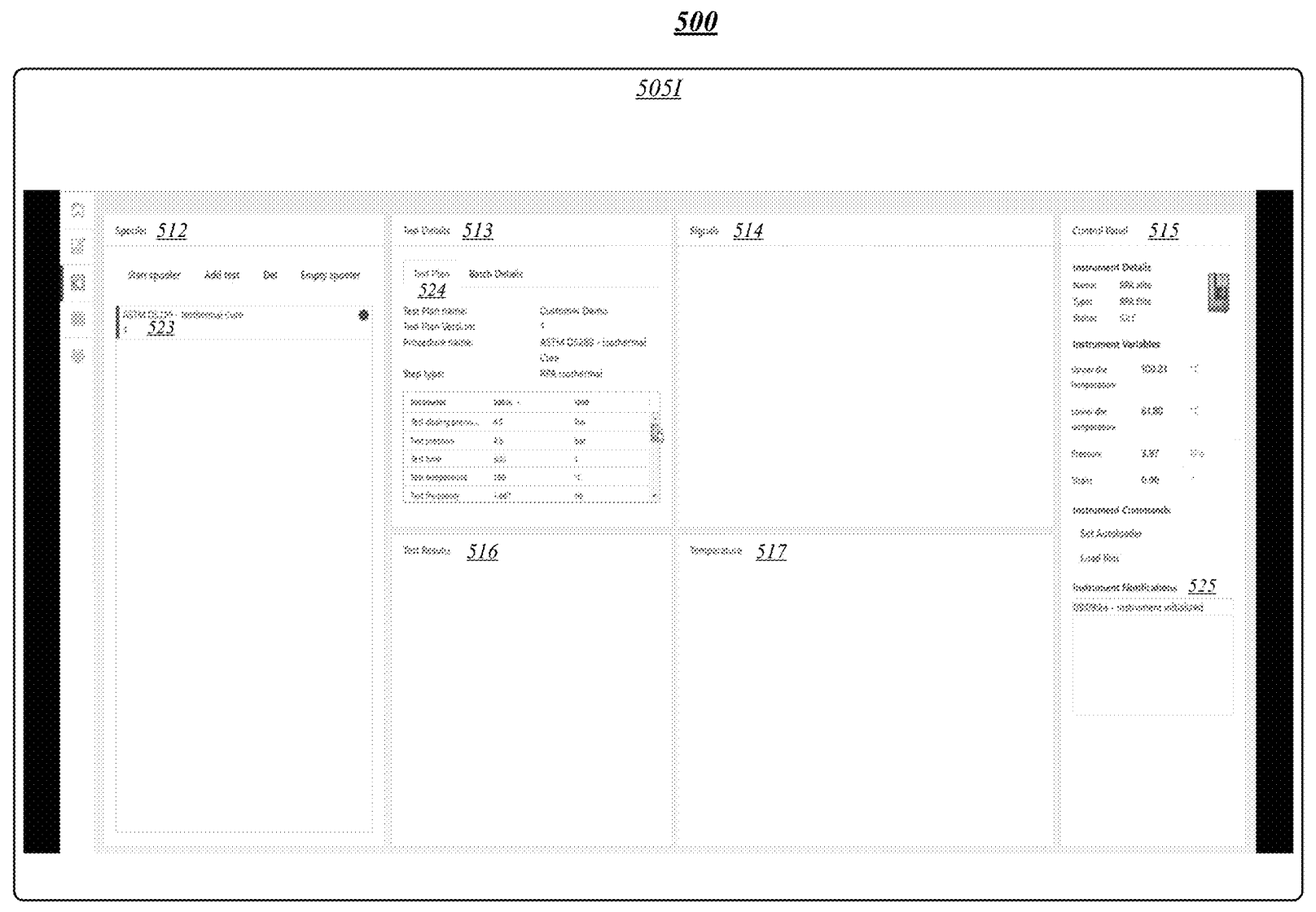
Figure 5J:
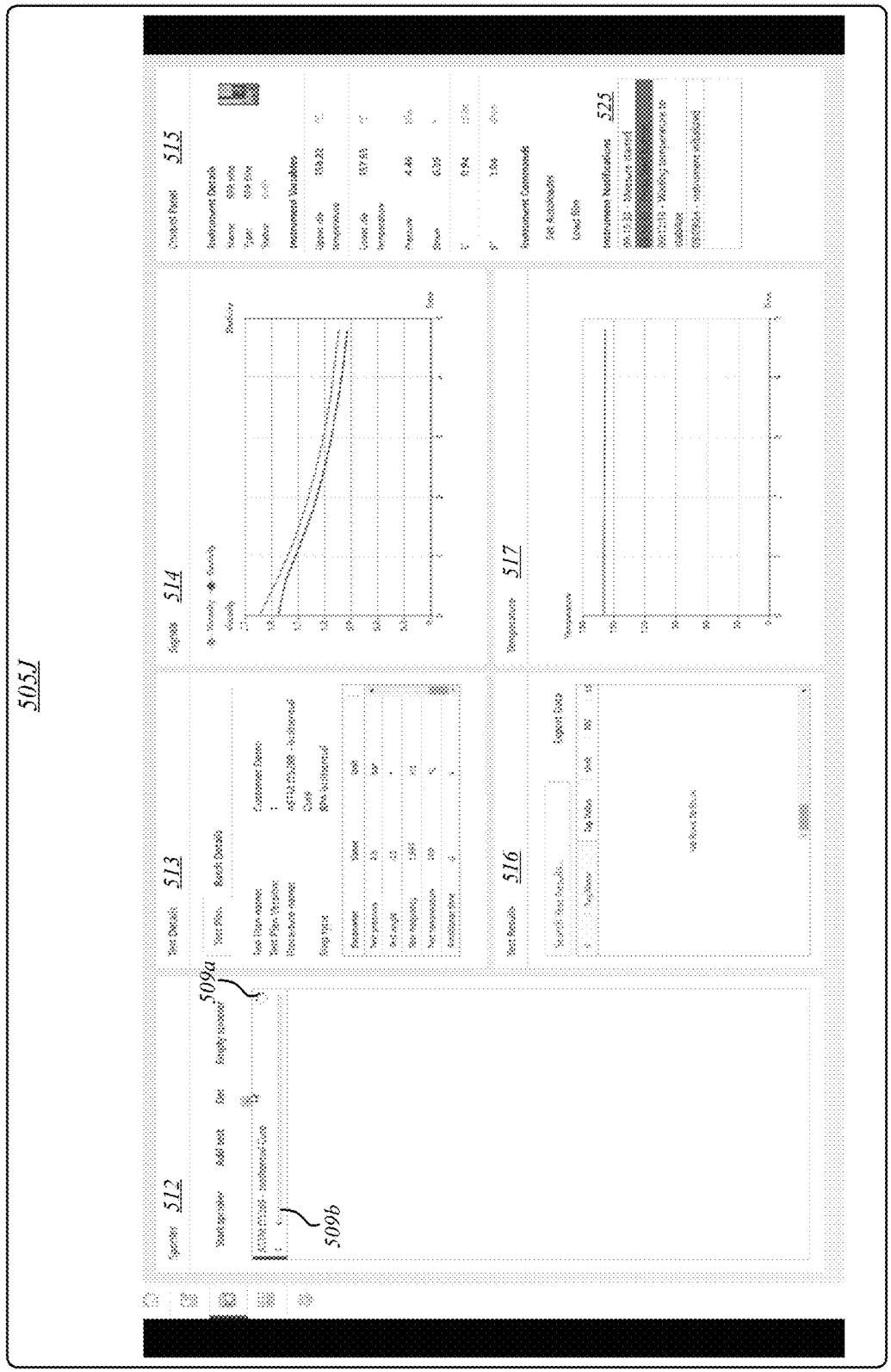
Figure 5K:
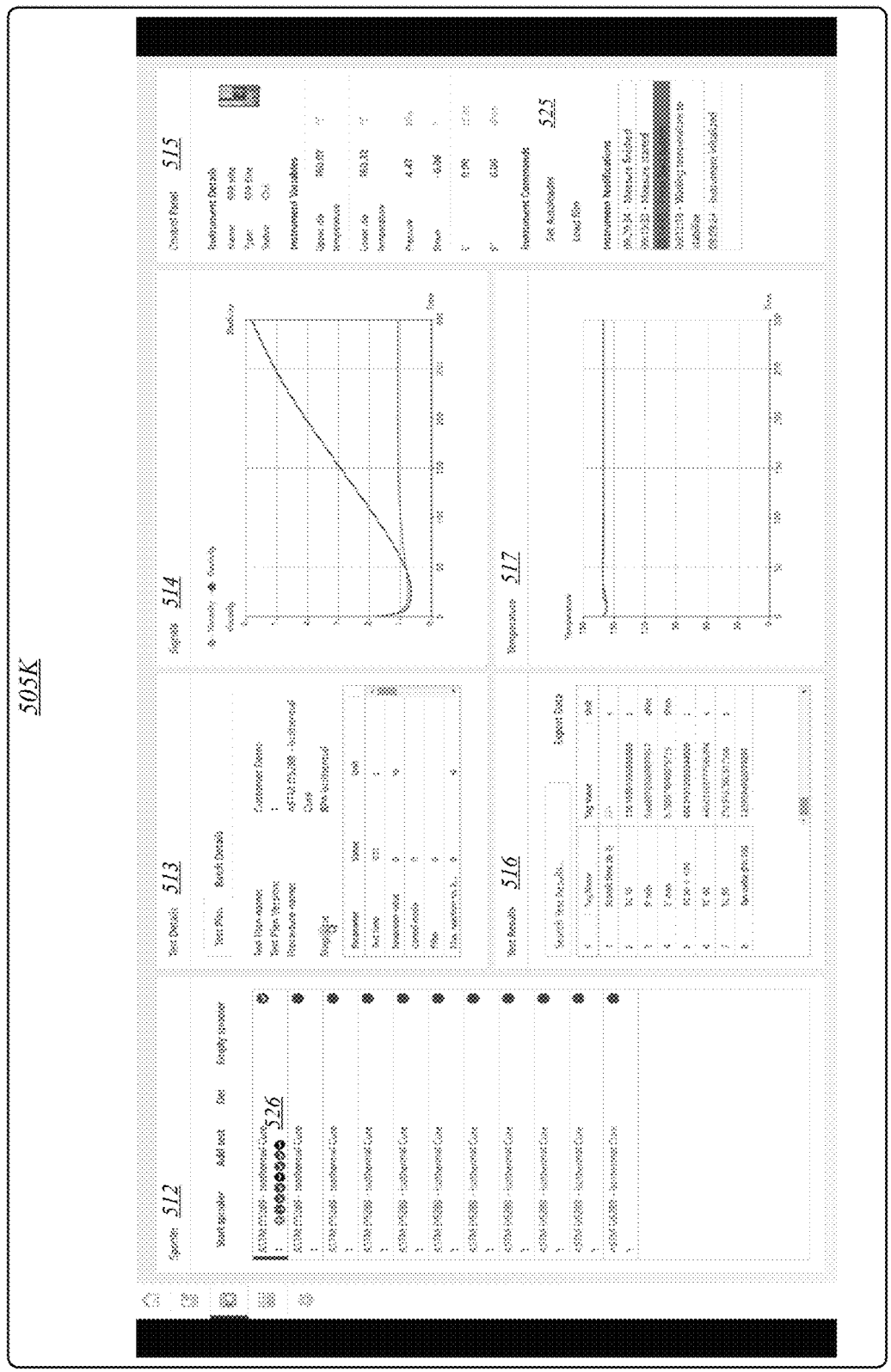
Figure 5L:
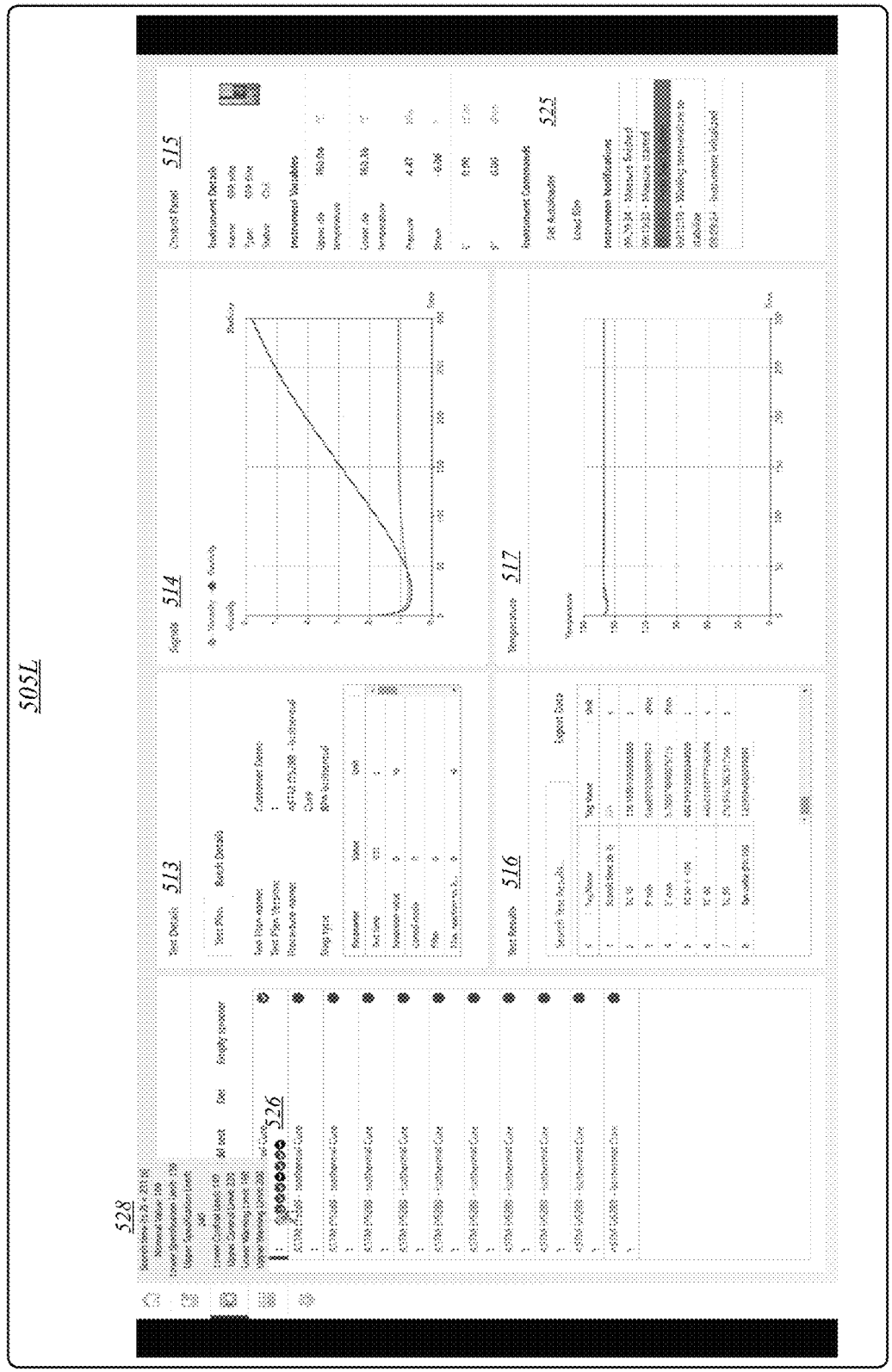
Figure 5M:
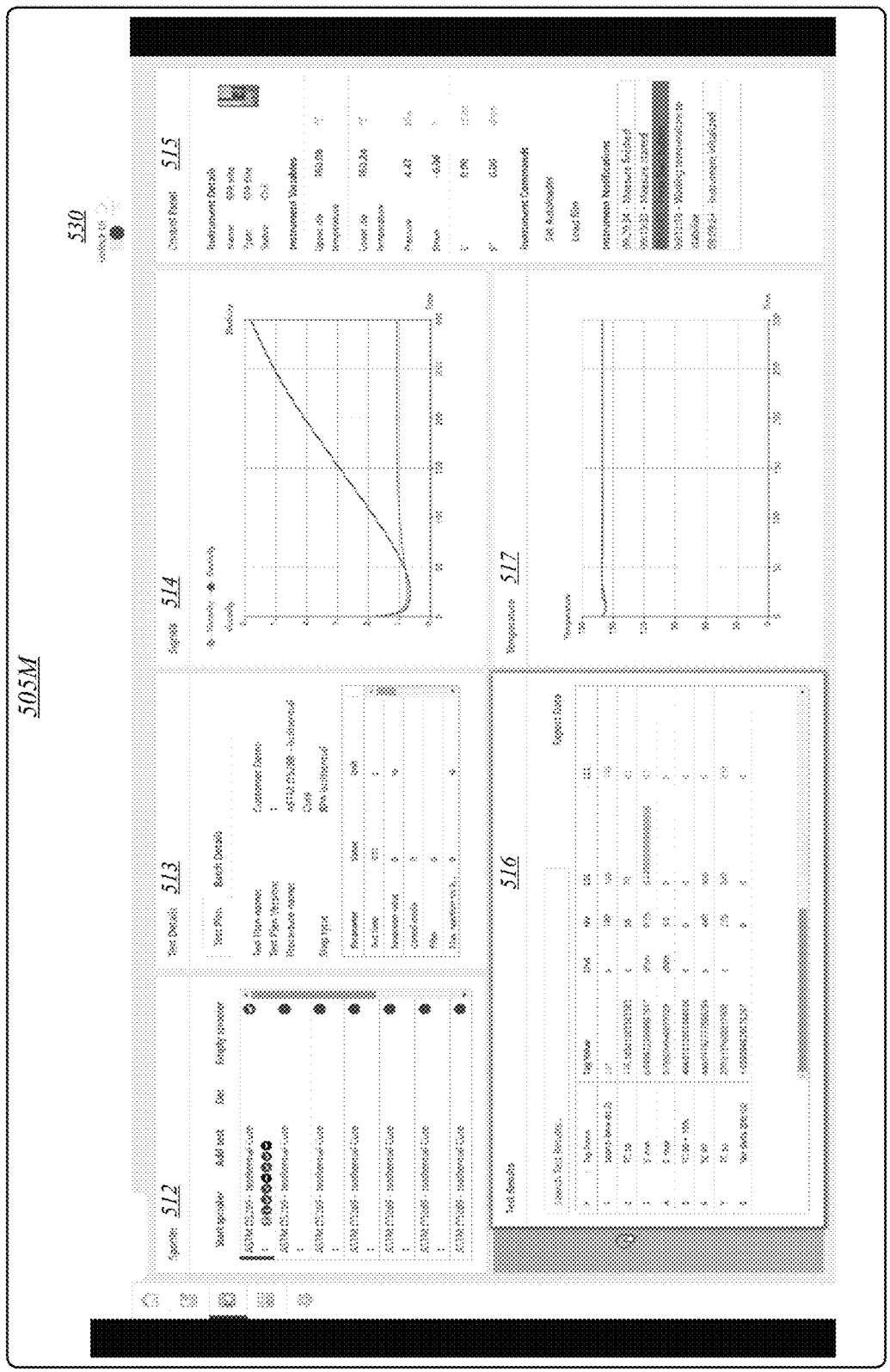
Figure 5N:
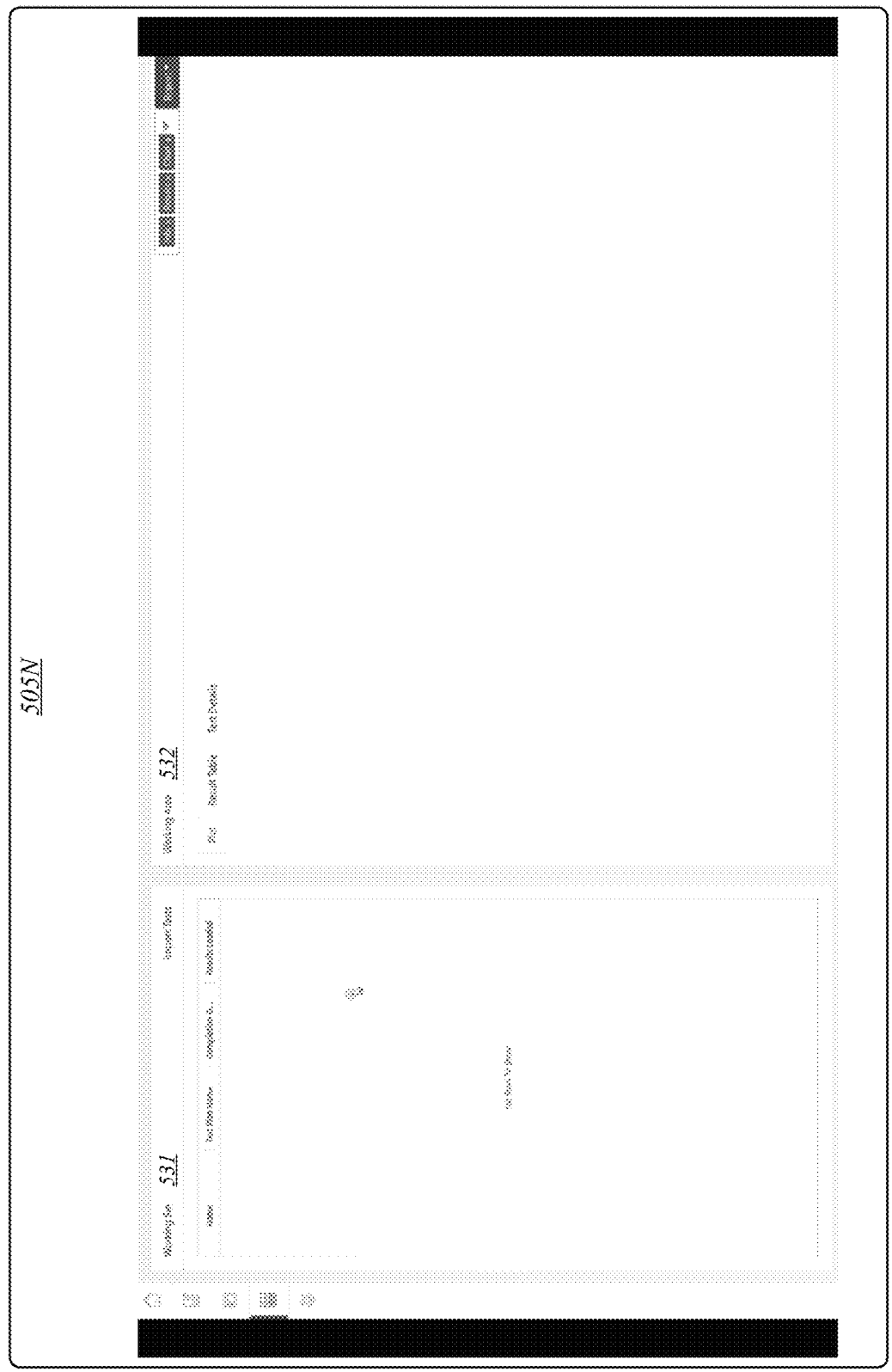

FIG. 4 illustrates an embodiment of a logic flow 400. Logic flow 400 may be representative of some or all of the operations executed by one or more embodiments described herein, such as computing device 110. FIGS. 5A-5R depict GUIs for an analytical services application according to some embodiments. In some embodiments, logic flow 400 may be representative of some or all of the operations of an analytical services application for executing a test plan and assessing test results via the GUIs depicted in FIGS. 5A-5R.

At block 402, logic flow 400 may create a test plan. For example, referring to FIG. 5A, therein is depicted a test plan screen 505A for selecting a test plan from a plurality of existing test plans 501. Each of test plans 501 may be associated with certain test plan information 132, such as a name, description, creation date, designations, version, status, actions, and/or the like. Test plans may include various procedure types including, without limitation, isothermal, non-isothermal, MV (with/without stress relaxation), Mooney scorch.

Optionally, at block 404, logic flow 400 may create a test plan. For example, referring to FIG. 5B, therein is depicted a test plan screen 505B for creating a new test plan. In some embodiments, test plan screen 505B may be used to open, edit, and save an existing test plan. As shown in FIGS. 5B-5D, test plan screen 505B may include test plan information 132 for creating a test plan, such as available procedures 503, a test plan summary 504, and test plan details 506. As shown in FIG. 5C, a test step 522 may be added to the test plan. Parameters 507 (FIG. 5C) and tags (FIGS. 5D-5E) for the test plan, such as step 522, may be specified via screens 505C-E. Referring to FIG. 5D, test plan screen 505D may allow for the specification of tags 508 and information/parameters associated therewith, such as units, nominal values, thresholds/limits (for instance, upper control limit, lower control limit, and/or the like), and/or the like. In some embodiments, users may select tags from a set of pre-defined tags (for instance, associated with a test plan and/or step type) and/or create a custom tag. In some embodiments, users may create a "tag library" that may be re-used, shared, and/or the like.

A user may define a test plan, which may include a multi-step procedure. The test plans may be saved and applied to other/new compounds. In addition, in some embodiments, each compound may have multiple test plans and/or steps applied to it (for instance, a single compound may have multiple MV, MDR, RPA procedures applied to it.

In some embodiments, for instance, a user may define a test plan that includes RPA procedures that has single or multiple step types including, without limitation, isothermal, non-isothermal, frequency sweep, amplitude sweep, conditioning, ramp test, relaxation, and/or the like. In various embodiments, a test plan may have multiple procedures of the same type (for instance, two isothermal steps, three amplitude sweep steps, and/or the like). Steps of a test plan may be selected from a library and/or created from scratch. In some embodiments, default values, thresholds, alarms, tags, and/or the like may be specified for a step and may be removed, added, and/or edited by a user. Test plans may include various types of steps including, without limitation, isothermal, non-isothermal, frequency sweep, amplitude sweep, conditioning, ramp test, temperature sweep, relaxation, variations thereof, combinations thereof, and/or the like.

In some embodiments, each test plan may include one or more steps. For example, an RPA test may include an isothermal step, two frequency sweep steps, and an amplitude sweep step. Each step may include one or more test parameters, including, without limitation, test temperature, test pressure, amplitude, test time, step tests (for instance, whether certain tests are to be included in the step, such as a low viscosity test for a frequency sweep step). Each step may include one or more tags associated with test data. For example, a frequency sweep step may include a G' (0.01 Hz) tag or TC 50 tag having a base unit, nominal value, lower specification limit, upper specification limit, lower control limit, upper control limit, lower warning limit, upper warning limit, and/or the like.

Logic flow 400 may run a test plan at block 406. For example, FIG. 5F depicts instrument list screen 505F having an instrument list 510 of available instruments 511a-n. Selection of an instrument, such as instrument 511n, may cause the presentation of instrument screen 505G depicted in FIG. 5G. Instrument screen 505G may depict various information elements associated with the selected instrument, such as spooler information 512, test details 513, signals 514, a control panel 515, test results 516, and temperature information 517. Referring to FIG. 5H, therein is depicted instrument test plan screen 505H for selecting a test plan to run on an instrument. Test plan screen 505H may include a listing of available test plans 519. Selection of a test plan 519 may cause the presentation of procedures 520 of the test plan. Batch configuration information 521 for the test plan may be specified via test plan screen 505H.

Figure 5O:
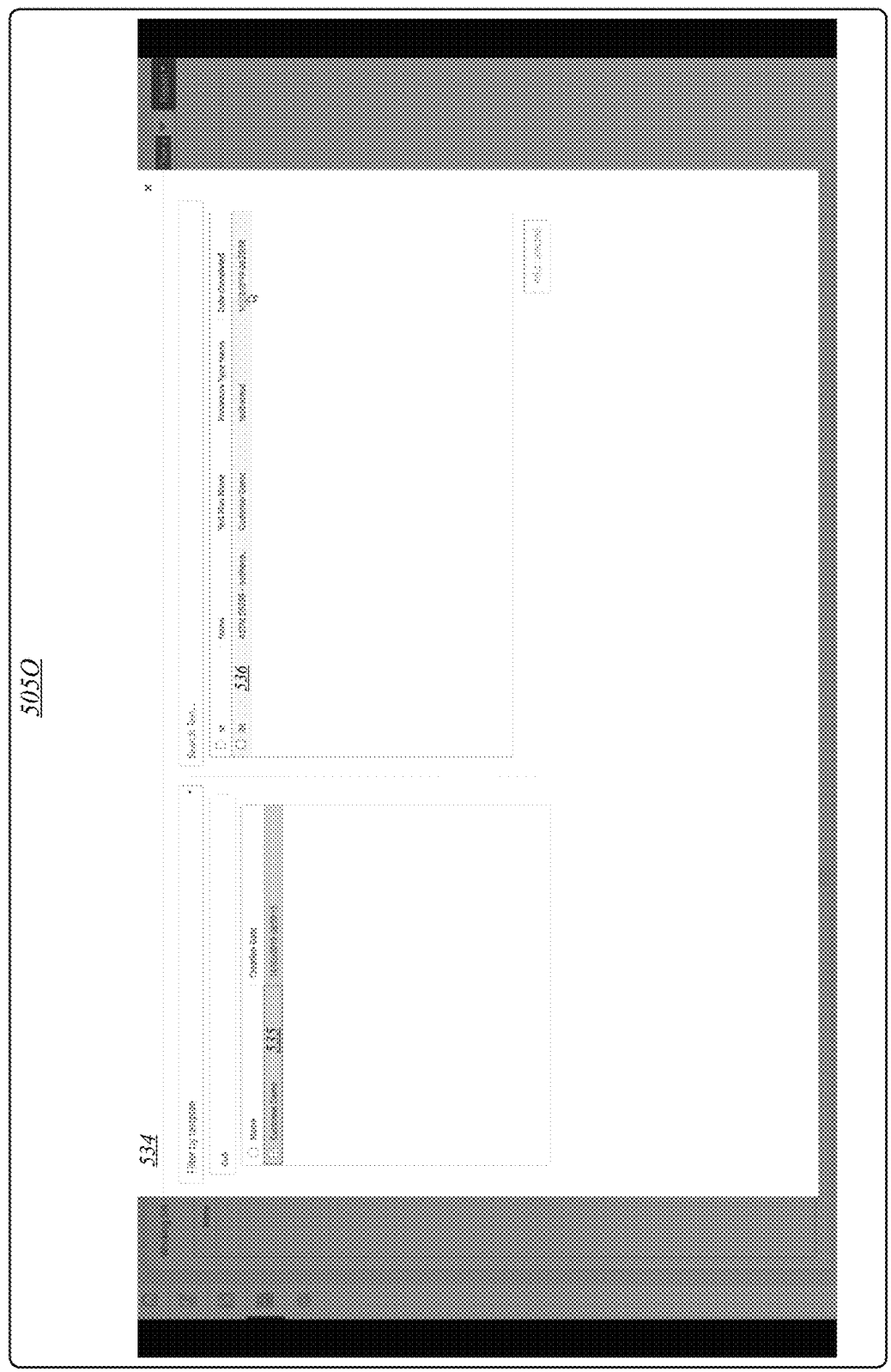

FIG. 5O5I depicts instrument test plan screen 505I presented responsive to selection of test plan 523 within spooler 512. Test details 513 of test plan 523 may be presented, such as test plan information 524 for a step type (for instance, RPA isothermal step of test plan 523). Each step of test plan 523 may be executed in order or in an order specified/modified by a user, including in parallel if possible (for instance, different steps run on different instruments). Control panel 515 may include an instrument notifications 525 object operative to present instrument status information, such as indicating that an instrument has been initialized and/or the like (see also, FIG. 5J).

FIG. 5J depicts instrument test plan screen 505J during execution of a test plan. Spooler 512 object may include status indicators 509a and 509b indicating the status of a test plan, such as whether the test plan is executing 509a, progress of test plan 509b, and/or the like. During execution of a test plan, test plan screen 505J may present relevant signals 514 (such as viscosity and elasticity for an RPA isothermal test) and temperature 517 information. Control panel 515 object may present information associated with the instrument, such as notifications 525, instrument details, instrument variables, available instrument commands, and/or the like.

Logic flow 400 may save test plan results at block 408. For example, test plan results may be saved to a database or other storage structure. In some embodiments, at least a portion of the saved test plan results may include raw data that may be used for post-acquisition processing. At block 410, logic flow 400 may analyze test plan results. Referring to FIG. 5K, therein is depicted a test plan results screen 505K according to some embodiments. As shown in FIG. 5K, a set of results indicators 526 may be presented indicating results of steps of a test plan. For example, results indicators 526 may include GUI elements or symbols indicating whether there were any issues with a step, whether the step was successful, information associated with a step, whether a step was run/skipped, and/or the like. In some embodiments, selecting a results indicator 526 may provide step information 528 as depicted in FIG. 5L including, without limitation, result values, threshold (control) limits, and/or the like.

In various embodiments, test results 516 may be presented to a user following completion of a test plan and/or a step of a test plan. In some embodiments, test results 516 may include tag-based results, for example, listing each tag associated with a test plan and/or step and the values associated with the tag. In various embodiments, at least a portion of test results 516 may include imported test results import, for example, from other instruments, historical data, and/or the like.

In some embodiments, certain objects depicted on GUI screens may unlocked, moved, repositioned, and/or the like. Referring to FIG. 5M, test plan results screen 505M may include an unlock element 530. Selection of unlock element 530 may allow for the repositioning, resizing, etc. of GUI objects, such as 512-517 (compare, for example, objects 512 and 516 on FIGS. 5L and 5M).

Figure 5P:
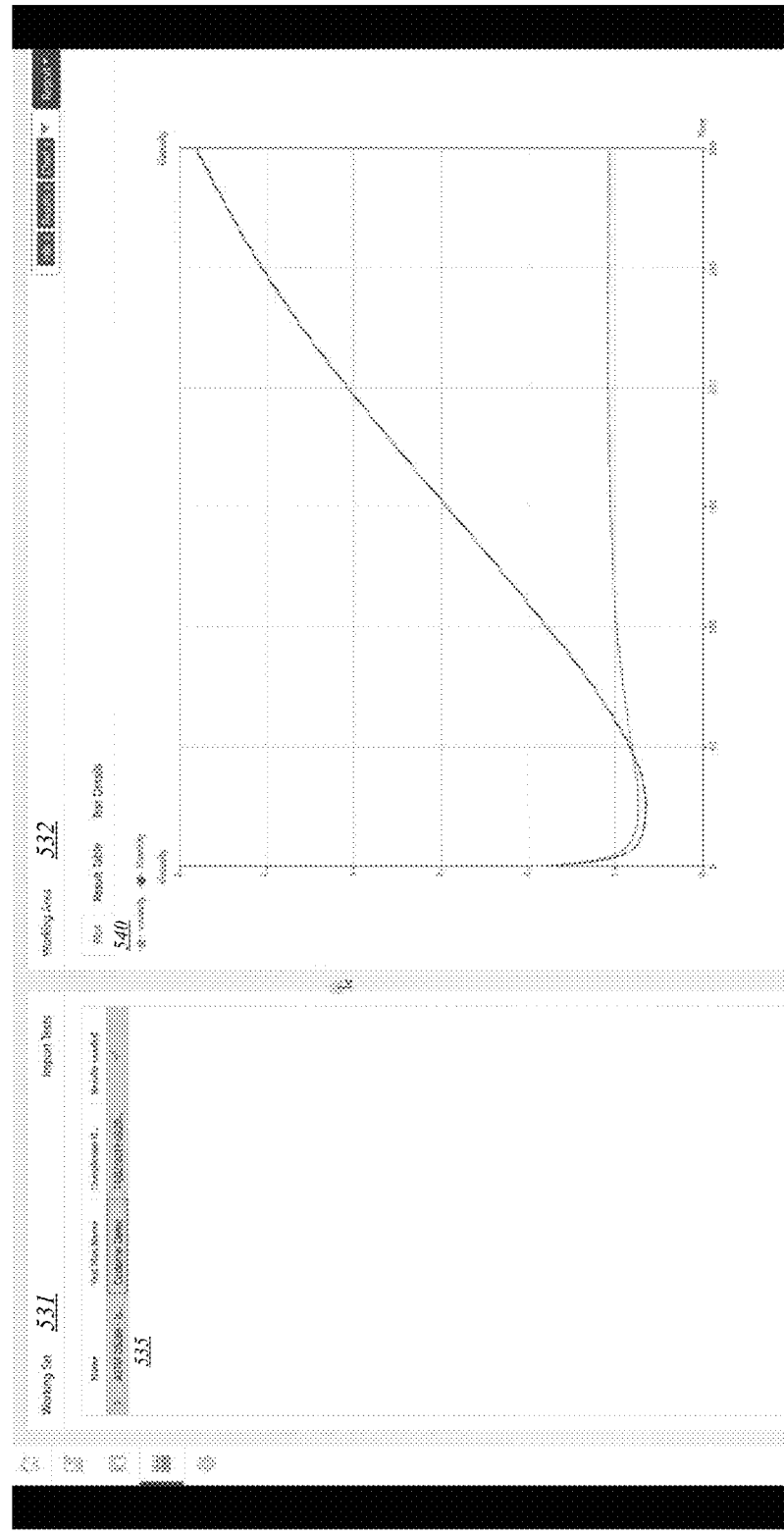
Figure 5Q:
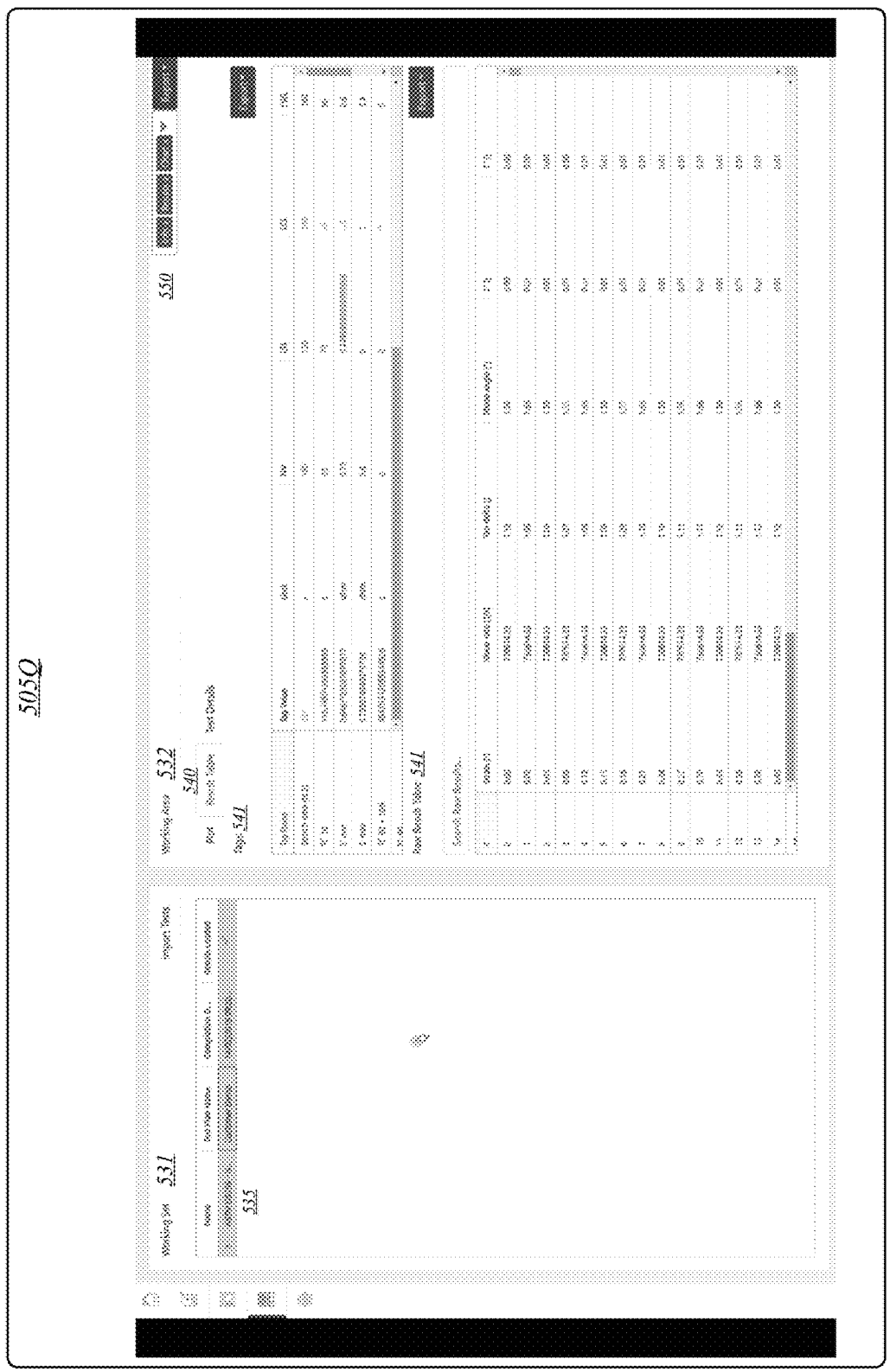
Figure 5R:
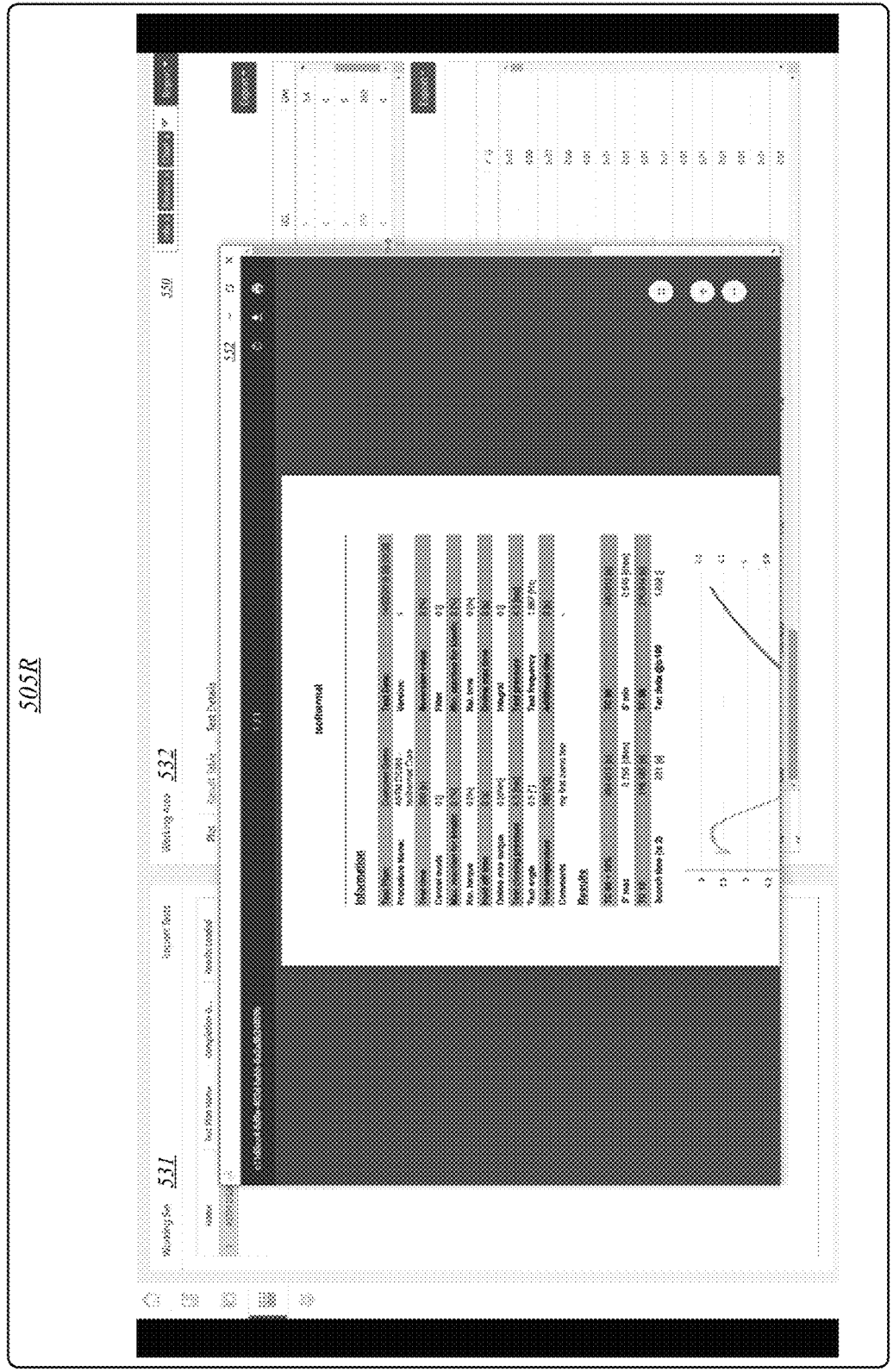

In some embodiments, process analysis may be provided as part of the analyzing test plan results function. Referring to FIG. 5N, therein is depicted a process analysis screen 505N, with a working set 531 GUI object and a working area 532 GUI object. Screen 505O of FIG. 5O depicts a test plan selection object 434 for selecting a test plan 535 and/or specific steps or tests 536 of test plan 535. FIG. 5P depicts a process analysis screen 505P responsive to selection of a test plan and/or step. As shown in FIG. 5P, a plot 540 for test plan 535 may be presented showing viscosity and elasticity for a step or test of test plan 535. Referring to FIG. 5Q, therein is depicted a results table 540 for test plan 535. In some embodiments, results table 540 may include tags 541 and/or raw results 541.

In some embodiments, data may be presented associated with a specific step. For example, an RPA test procedure may include the following: Step 1: conditioning step (isothermal for 10 min); Step 2: Frequency sweep; Step 3: Amplitude sweep from low strain to high strain; and Step 4: Amplitude sweep from high strain to low strain. After the RPA test procedure is executed, an operator may view data from step 3 and be able to visually confirm that the data from Step 3 and that it underwent a conditioning step of 10 minutes (for example, via a record entry, pop-up responsive to hovering over data, and/or the like).

At block 412, logic flow 400 may report test plan results. In some embodiments, reporting GUI objects 550 may be provided to implement a reporting function. For example, a user may select information to include in a report (for instance, information, data, charts, and/or the like). Referring to FIG. 5R, therein is depicted a report 552 generated for an isothermal test step of test plan 535.

Figure 6:
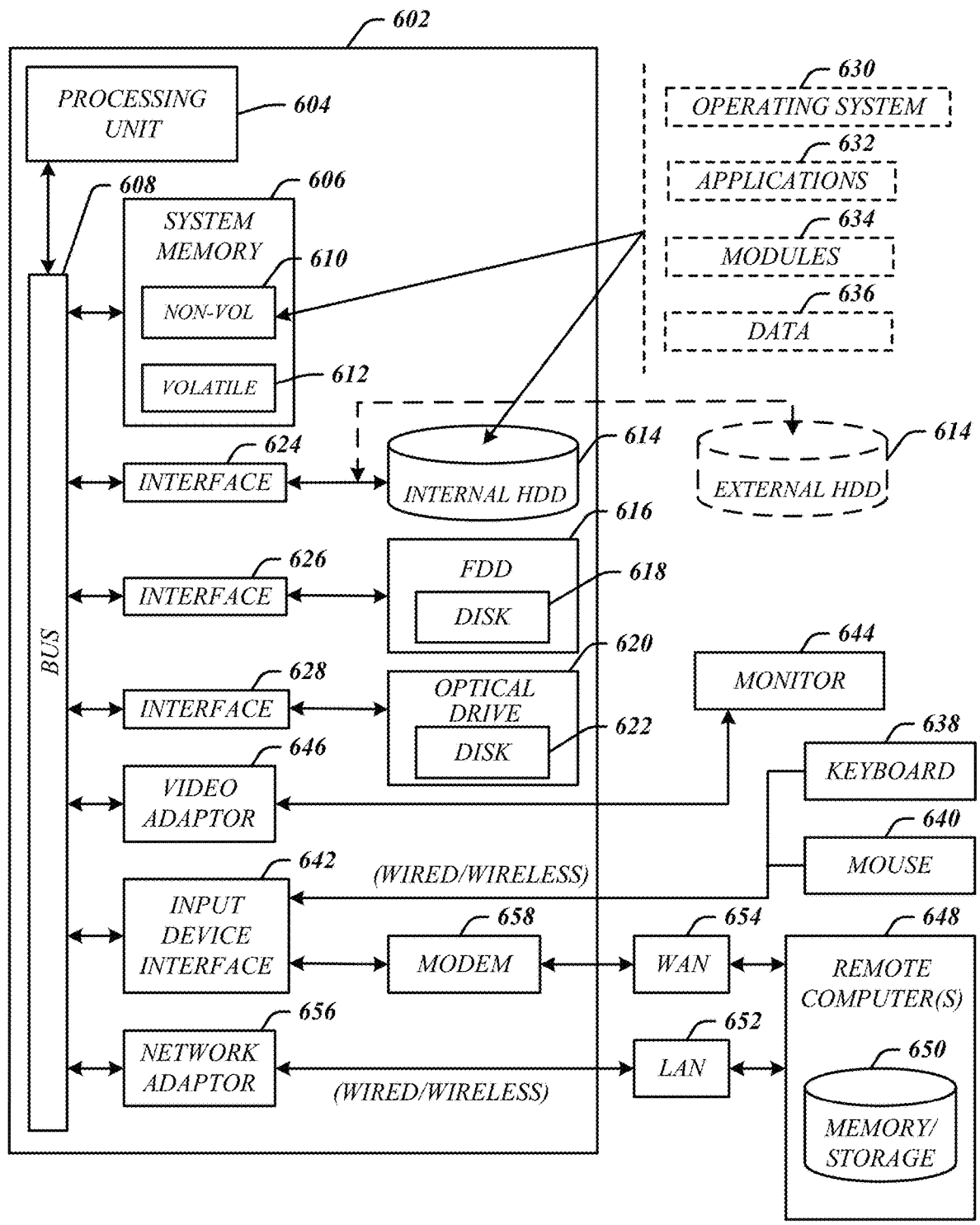
FIG. 6 illustrates an embodiment of a computing architecture.

FIG. 6 illustrates an embodiment of an exemplary computing architecture 600 suitable for implementing various embodiments as previously described. In various embodiments, the computing architecture 600 may comprise or be implemented as part of an electronic device. In some embodiments, the computing architecture 600 may be representative, for example, of computing device 110. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 604.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 620, respectively. The HDD interface 624 for external drive implementations can include at least one or both of Universal Serial Bus (USB) and IEEE 1384 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and/or components of computing device 110.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising: at least one memory; and
a processor coupled to the at least one memory, the processor configured to perform a test plan using a plurality of different types of rubber material analytical instruments managed via a central graphical user interface (GUI) via:
accessing, using an analytical services application, a test plan comprising at least one step, wherein the analytical services application comprises an instrument service hosting layer including a service corresponding to each of the different types of rubber material analytical instruments, the service providing an instrument handler for performing operation steps or commands on the respective type of rubber material analytical instrument associated with the service;
configuring the plurality of different types of rubber material analytical instruments to perform an experiment based on the test plan using the instrument handlers of the different types of rubber material analytical instruments of the analytical services application;
generating test plan results responsive to performing the test plan on the plurality of different types of rubber material analytical instruments, analyzing the test plan results, and presenting the test plan results on a plurality of GUI objects in the central GUI.

2. The apparatus of claim 1, wherein the at least one rubber material analytical instrument comprises at least one of a rheometer, a moving die rheometer (MDR), a viscometer, a Mooney viscometer (MV), a rubber process analyzer (RPA), an automated density tester (ADT), or an automated hardness tester (AHT).

3. The apparatus of claim 1, wherein the at least one step comprises at least one of isothermal, non-isothermal frequency sweep, amplitude sweep, conditioning, ramp test, or relaxation.

4. The apparatus of claim 1, wherein the at least one step is associated with at least one tag, the at least one tag for defining an element of results data.

5. The apparatus of claim 4, wherein the at least one tag comprises a results value and at least one threshold value.

6. The apparatus of claim 1, wherein the at least one step comprises a plurality of steps, the logic configured to modify an execution order of the plurality of steps responsive to user input via one of the plurality of GUI objects.

7. The apparatus of claim 1, wherein the logic is configured to present a results GUI screen, the results GUI screen displaying a results indicator for the at least one test plan executed via the at least one rubber material analytical instrument, the results indicator comprising graphical symbols indicating information associated with executed steps of the step plan.

8. The apparatus of claim 1, wherein the logic is configured to create a test plan comprising test plan information, the test plan information comprising at least one or more of available procedures, test plan summary, or test plan details.

9. The apparatus of claim 8, wherein the test plan information further comprises one or more test steps, the one or more test steps comprising one or more parameters.

10. The apparatus of claim 9, wherein the one or more parameters comprise one or more of units, default values, nominal values, alarms, tags, thresholds, limits, upper control limits, lower control limits, temperature, pressure, amplitude, time, and step tests.

11. The apparatus of claim 9, wherein the one or more test steps comprise one or more test step types, the test step types comprising one or more of isothermal, non-isothermal, viscosity, elasticity, frequency sweep, amplitude sweep, conditioning, ramp test, or relaxation.

12. The apparatus of claim 11, wherein the tags comprise one or more of base units, nominal value, lower specification limit, upper specification limit, lower control limit, upper control limit, lower warning limit, or upper warning limit.

13. A computer-implemented method to perform a test plan on a plurality of different types rubber material analytical instruments managed via a central graphical user interface (GUI), the method comprising, via a processor of a computing device operably coupled to the plurality of different types of rubber material analytical instruments:

accessing, using an analytical services application, a test plan comprising at least one step, wherein the analytical services application comprises an instrument service hosting layer including a service corresponding to each of the different types of rubber material analytical instruments, the service providing an instrument handler for performing operation steps or commands on the respective type of rubber material analytical instrument associated with the service;

configuring the plurality of different types of rubber material analytical instruments to perform an experiment based on the test plan using the instrument handlers of the different types of rubber material analytical instruments of the analytical services application;

generating test plan results responsive to performing the test plan on the plurality of different types of rubber material analytical instruments; analyzing the test plan results; and presenting the test plan results on a plurality of GUI objects in the central GUI.

14. The method of claim 13, wherein the at least one step comprises at least one of isothermal, non-isothermal, frequency sweep, amplitude sweep, conditioning, ramp test, or relaxation.

15. The method of claim 13, wherein the at least one step comprises a plurality of steps, the method further comprising modifying an execution order of the plurality of steps responsive to user input via one of the plurality of GUI objects.

16. A non-transitory computer-readable medium storing instructions that, when executed, cause one or more processors to perform a test plan on a plurality of different types of rubber material analytical instruments managed via a central graphical user interface (GUI) to:

access, using an analytical services application, a test plan comprising at least one step, wherein the analytical services application comprises an instrument service hosting layer including a service corresponding to each of the different types of rubber material analytical instruments, the service providing an instrument handler for performing operation steps or commands on the respective type of rubber material analytical instrument associated with the service;

configure the plurality of different types of rubber material analytical instruments to perform an experiment based on the test plan using the instrument handlers of the different types of rubber material analytical instruments of the analytical services application;

generate test plan results responsive to performing the test plan on the plurality of different types of rubber material analytical instruments; analyzing the test plan results; and present the test plan results on a plurality of GUI objects in the central GUI.

17. The non-transitory computer-readable medium of claim 16, wherein the at least one step comprises at least one of isothermal, non-isothermal, frequency sweep, amplitude sweep, conditioning, ramp test, or relaxation.

* * * * *